(12) United States Patent
Thomas

(10) Patent No.: US 8,966,703 B1
(45) Date of Patent: Mar. 3, 2015

(54) SHOCK ABSORBING TOOL

(71) Applicant: Paul B. Thomas, San Pedro, CA (US)

(72) Inventor: Paul B. Thomas, San Pedro, CA (US)

( * ) Notice: Subject to any disclaimer, the term of this patent is extended or adjusted under 35 U.S.C. 154(b) by 329 days.

(21) Appl. No.: 13/650,242

(22) Filed: Oct. 12, 2012

Related U.S. Application Data

(63) Continuation-in-part of application No. 12/317,747, filed on Dec. 29, 2008, now Pat. No. 8,312,589.

(51) Int. Cl.
    *A47L 13/12* (2006.01)
    *B60S 3/04* (2006.01)
    *A47L 1/16* (2006.01)

(52) U.S. Cl.
    CPC ... *A47L 1/16* (2013.01); *B60S 3/045* (2013.01)
    USPC .................. 15/236.01; 15/236.05; 15/236.02

(58) Field of Classification Search
    USPC ............................... 15/236.01–236.08, 144.1
    See application file for complete search history.

(56) References Cited

U.S. PATENT DOCUMENTS

| | | | | |
|---|---|---|---|---|
| 3,116,502 | A * | 1/1964 | Gerber | 15/105 |
| 4,305,175 | A * | 12/1981 | Burgess, Jr. | 15/236.02 |
| 4,748,711 | A * | 6/1988 | Markus | 15/227 |
| 6,757,930 | B2 * | 7/2004 | Kajgana | 15/111 |
| 7,469,444 | B1 * | 12/2008 | Thomas | 15/236.02 |
| 8,312,589 | B1 * | 11/2012 | Thomas | 15/236.02 |

* cited by examiner

*Primary Examiner* — Shay Karls
(74) *Attorney, Agent, or Firm* — Jerry Fong

(57) ABSTRACT

An improved shock absorbing tool utilizing a push and pull action to absorb the reciprocation movement of the tool. A forward blade member has a wedge head and a shaft connected to a proximal end of the head. An insert is press-fitted within a handgrip, wherein the insert receives the shaft of the forward blade member. A rear blade member has a sleeve with a wedge blade and connected to a proximal end of the sleeve and extends downwardly away from the sleeve. The sleeve surrounds a portion of the shaft of the forward blade member. The coil spring surrounds a portion of the shaft of the forward blade member and located between the proximal end of the head and rests within the sleeve for absorbing the impact force of the reciprocation movement the forward blade member and the rear blade member. The O-ring is placed between the proximal end of the head and the upper end of the coil spring to further absorbs the impact force of the forward and rear blade members.

20 Claims, 22 Drawing Sheets

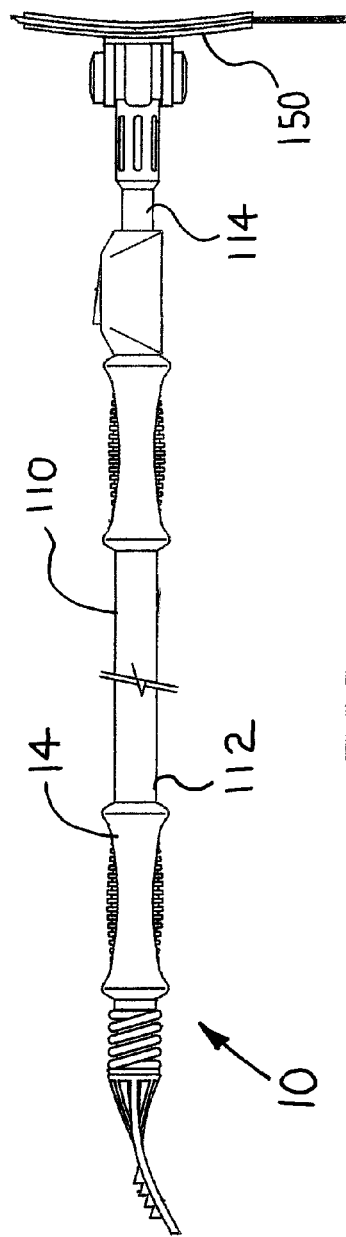
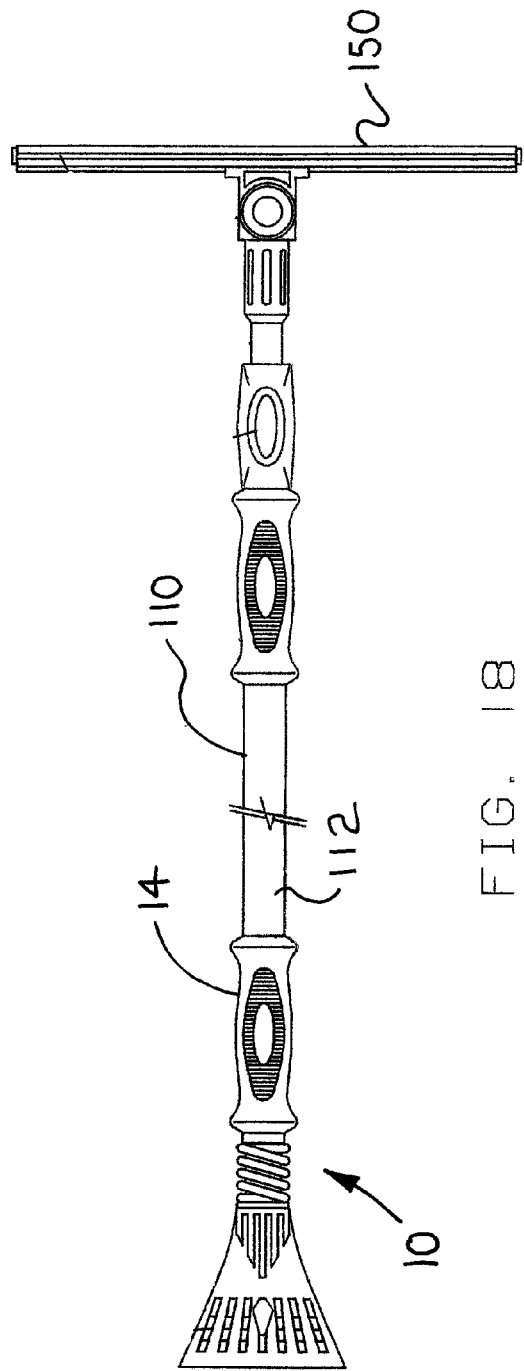

SHOCK ABSORBING TOOL

CROSS-REFERENCE TO RELATED APPLICATIONS

This application is a continuation-in-part of application Ser. No. 10/881,770 filed on Jun. 30, 2004, now U.S. Pat. No. 7,469,444 which is a continuation-in-part of application Ser. No. 12/317,747 filed on Dec. 29, 2008, now pending.

BACKGROUND OF THE INVENTION

1. Field of the Invention

The present invention relates generally to the field of ice scrapers. More particularly, the present invention relates to the field of shock absorbing ice scrapers for use in scraping ice, snow or frost accumulating on windshields and windows of vehicles. In particular, the present invention is an improvement of shock absorbing scrapers for scraping by a push and pull action. More particularly, the present invention is a shock absorbing tool utilizing push and pull action to absorb the reciprocation movement of the tool.

2. Description of the Prior Art

Various scrapers have been proposed in the art and implemented for scraping the winter elements off a vehicle's windshield and windows. A number of scrapers are fairly short arcuate devices while others comprise an elongated handle with a scraper blade at one end. In addition, some ice scrapers employ a scraper at one end of an elongated handle with a brush being mounted on the other end. Although the longer ice scrapers described above provide an extended reach, it is difficult for the user to apply sufficient scraping pressure to the scraper blade.

Conventional scrapers have a handle which is grasped in the hand and used to press the scraping edge of the tool against the surface that is being scraped. This manner of scraping exerts considerable stress on the wrist and requires the wrist to be flexed at various angles, and therefore frequently leads to wrist injuries. The amount of force that can be applied to the surface is also somewhat limited because of the limited strength of the wrist and this detracts from the effectiveness and efficiency of the scraping process.

The problems associated with conventional scrapers have been recognized and efforts to improve the scraper design have been made. However, they have not been altogether successful either functionally or commercially.

U.S. Pat. No. 6,662,399 issued to Vairo on Dec. 16, 2003 discloses an ice scraper which includes an elongated handle portion having a scraper blade mounted at one end and a U-shaped yoke mounted at the other end. The U-shaped yoke has a pair of spaced-apart yoke members which have a U-shaped arm or wrist engaging member and which extends therebetween. An optional brush is secured to the handle portion adjacent the scraper blade but disposed oppositely. This device does not have a shock absorbing means for the scraping head, and thereby causes wrist and hand injure.

U.S. Pat. No. 6,640,943 issued to Daws et al. on Nov. 4, 2003 discloses a shock absorber with sealing ice scraper. The shock absorber includes a piston assembly and a damping fluid cylinder having a first end and defining a damping fluid chamber.

U.S. Pat. No. 5,471,698 issued to Francis et al. on Dec. 5, 1995 discloses a hand tool having interchangeable accessories. It comprises a frame which holds interchangeable working heads for scraping ice and other materials, scrubbing and sanding. The frame pivotally carries the working head at one end. Again, this device does not have a shock absorbing means for the scraping head, and thereby causes wrist and hand injure.

U.S. Pat. No. 5,455,981 issued to Wiese on Oct. 10, 1995 discloses a paint scraper. The paint scraper includes a blade for scraping paint from a surface by pulling and pushing the blade along the surface while the blade is held in pressure contact with the surface. The paint scraper includes a handle carrying the blade with the handle having a first cylindrical portion for grasping in different hand positions with a thumb and fingers of a user's hand and a lever arm extending from the handle, with the lever arm extending substantially at a right angle to the handle and having an opening so as to permit insertion and repositioning of a user's forearm with the lever arm having an arm cradle having an arcuate shape for engaging an extended portion of a user's forearm.

U.S. Pat. No. 4,984,324 issued to Farris on Jan. 15, 1991 discloses a push-pull paint scraper tool which has a two-section handle attached to a support head. The two handle sections are offset at predetermined angles relative to a scraper blade coupling surface portion of the support head. A scraper plate has push and pull scraper blades which is removably mounted onto the support head.

U.S. Pat. No. 4,962,561 issued to Hamilton on Oct. 16, 1990 discloses a scraping device which includes a handle with a looped section for engaging the upper forearm adjacent the elbow. The looped section has a curvature which accommodates a thick winter coat.

U.S. Pat. No. 5,897,119 issued to McMillen on Apr. 27, 1999 discloses a floating wiper seal assembly for sealingly engaging a reciprocating shaft within a hydraulic pump housing.

U.S. Pat. No. 4,813,458 issued to Jacobucci on Mar. 21, 1989 discloses an ice, frost, and snow scraper for vehicle windscreens. The scraper includes a center handle which acts as a fulcrum and two lever arms which act as levers. The two lever arms are incurved and joined each other to form the forearm rest at the rear extremity of the scraper.

U.S. Pat. No. 4,305,175 issued to Burgess, Jr. on Dec. 15, 1981 discloses a scraping tool for scraping ice from an automobile windshield. The tool includes a shell member having two pairs of blades disposed longitudinally along the shell. One blade from each pair is straight and disposed transversely across the shell while the other blade from each pair is arcuate in shape and spaced apart from the first blade at the center portions and joined at the distal ends.

It is highly desirable to have a very efficient and also very effective design and construction of a shock absorbing ice scraper for scraping ice, snow or frost from windows of a vehicle. It is desirable to provide a shock absorbing ice scraper for absorbing impact to the hand and wrist of a user to prevent injuries. It is also desirable to provide an interchangeable scraper head with the shock-absorbing feature of the present invention. It is further desirable to provide an improved shock absorbing scraper utilizing a push and pull action. It is further desirable to provide a shock absorbing tool utilizing an improved push and pull action to absorb the reciprocation movement of the tool.

SUMMARY OF THE INVENTION

The present invention is a shock absorbing ice scraper for scraping ice, snow and frost from windows of a vehicle or the like surface. The scraper includes a scraper member, a hand-grip member, an insert member, a coil spring, and a resilient O-ring. The scraper member includes a head portion and a shaft portion connected to one end of the head portion. The head portion has a scraper blade on the other end. The handgrip member has a bore communicating with an open end. The insert member has a bore communicating with an open end and means for preventing transverse movement of the shaft portion of the scraper member within the bore of the handgrip member. The insert member is press-fitted or over molded within the bore of the handgrip member. The coil spring is located between the head portion and the handgrip member for absorbing the impact force of the reciprocation movement of the head portion of the scraper member. The resilient O-ring is located between the one end of the head portion and the coil spring to further absorbs the impact force of the head portion of the scraper member.

It is an object of the present invention to provide an improved ice scraper.

It is also an object of the present invention to provide a shock absorbing ice scraper which is easily gripped with one hand to exert pressure on the windshield or a like surface for scraping so that even the most tenacious ice can be removed.

It is an additional object of the present invention to provide a shock absorbing ice scarper for absorbing impact force of the ice scraper, thereby preventing injure to the wrist and hand of a user.

It is a further object of the present invention to provide an improved handgrip member which includes a thumb rest, a finger separator, a closed palm striking end, and a curved portion for providing pushing angle for the user's hand.

It is still a further object of the present invention to provide a shock absorbing ice scraper which is reversible in that pressure may be applied to either a scraper blade or a plurality of spaced apart scraping ribs.

It is still a further object of the present invention to provide a shock absorbing ice scraper which is durable in use, refined in appearance, and simple and economical to construct.

It is also a further object of the present invention to provide a shock absorbing scraper for scraping by a push and pull action.

The present invention is an improved shock absorbing tool utilizing a push and pull action to absorb the reciprocation movement of the tool. The shock absorbing tool includes a forward or first blade, a lower or second blade, a handgrip, an insert, a coil spring, and an O-ring. The forward blade includes a wedge shaped head and a shaft connected to the proximal end of the head. The handgrip has a bore which communicates with an open end. The insert has a bore which communicates with an open end and means for preventing the transverse and longitudinal movements of the shaft of the forward blade within the bore of the handgrip. The insert can be press-fitted or over molded within the bore of the handgrip. The second blade has a sleeve or collar with a wedge shaped blade connected to the upper end of the sleeve and extends downwardly away from the sleeve. The sleeve is slidably installed and surrounded a portion of the shaft of the forward blade and located adjacent to the upper end of the handgrip. The coil spring also surrounds a portion of the shaft of the forward blade and located between the proximal end of the head and rests within the sleeve of the lower blade for absorbing the impact force of the reciprocation movement of the head of the forward blade and the lower blade. The O-ring is placed between the proximal end of the head and the upper end of the coil spring to further absorbs the impact force of the head of the first blade and the second blade.

It is a further object of the present invention to provide an improved shock absorbing tool which can be utilizing with different types of garden tools wherein the garden tool may be a garden hoe tool.

It is another object of the present invention to provide an improved shock absorbing tool which may be a paint scraper.

It is still a further object of the present invention to provide an improved shock absorbing tool which may be a combination shovel and hoe tool.

It is still a further object of the present invention to provide an improved shock absorbing tool which may be a mallet.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 17 is a top plan view of the present invention shock absorbing ice scraper utilizing an extension pole;

FIG. 18 is a side elevational view of the shock absorbing ice scraper shown in FIG. 17;

DETAILED DESCRIPTION OF THE PREFERRED EMBODIMENTS

In the following description of the preferred embodiment, reference is made to the accompanying drawings which form a part hereof, and in which is shown by way of illustration a specific embodiment in which the present invention may be practiced. It is to be understood that other embodiments may be utilized and structural changes may be made without departing from the scope of the present invention.

Figure 2:
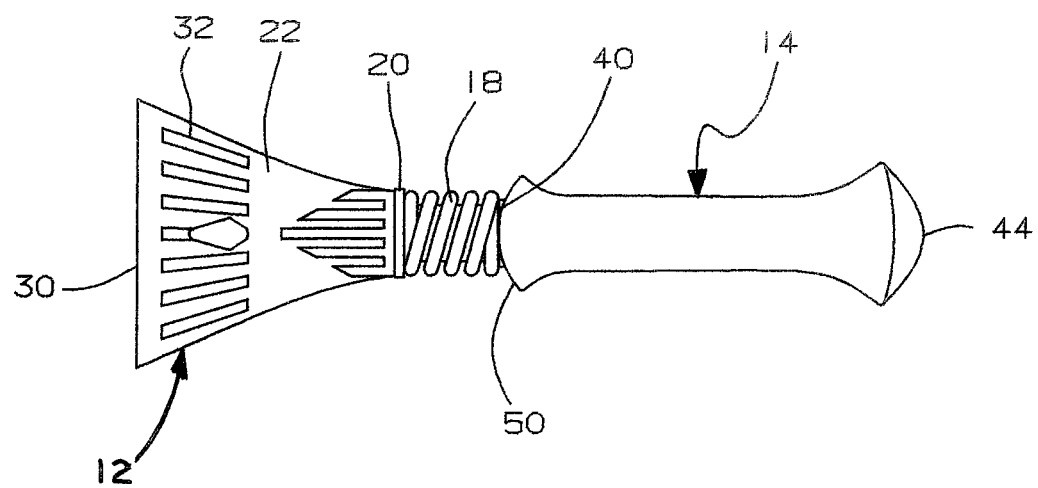
FIG. 2 is a top plan view of the present invention shock absorbing ice scraper shown in FIG. 1.
Figure 1:
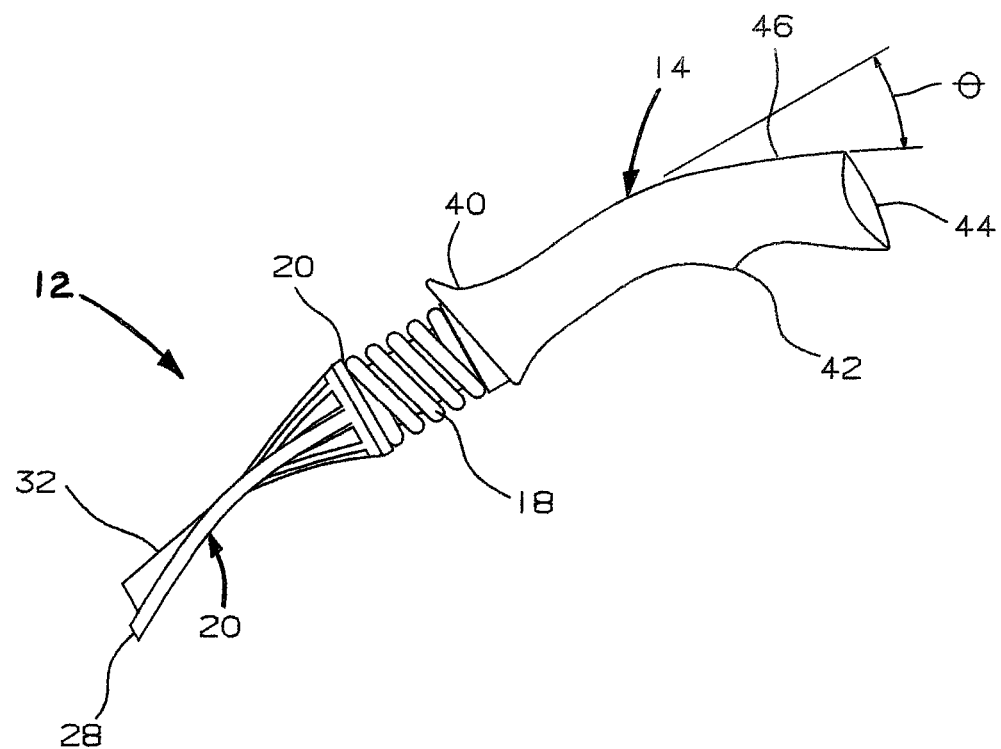
FIG. 1 is a side elevational view of the present invention shock absorbing ice scraper.
Figure 3:
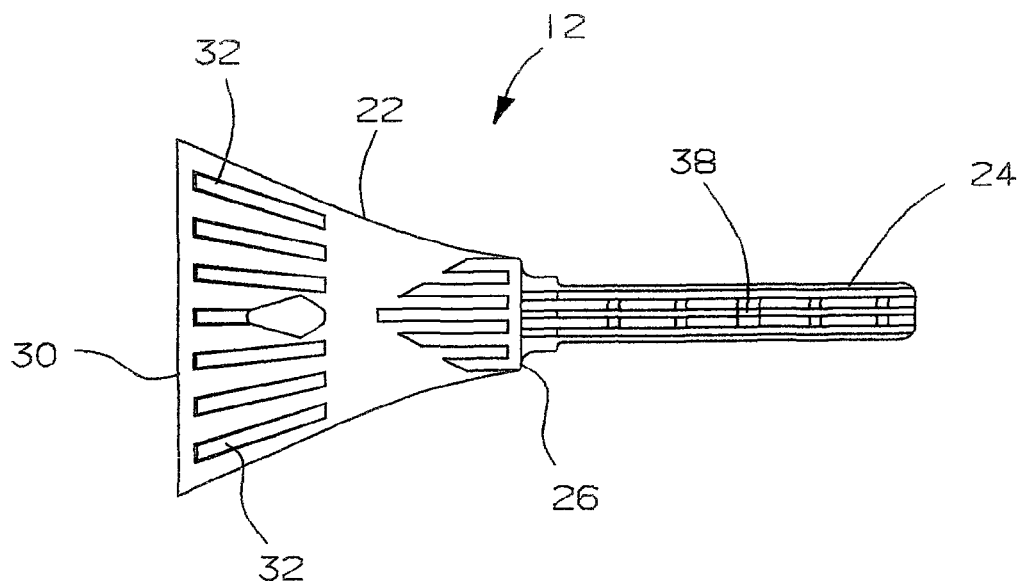
FIG. 3 is a top plan view of the scraper member of the present invention shock absorbing ice scraper.
Figure 4:
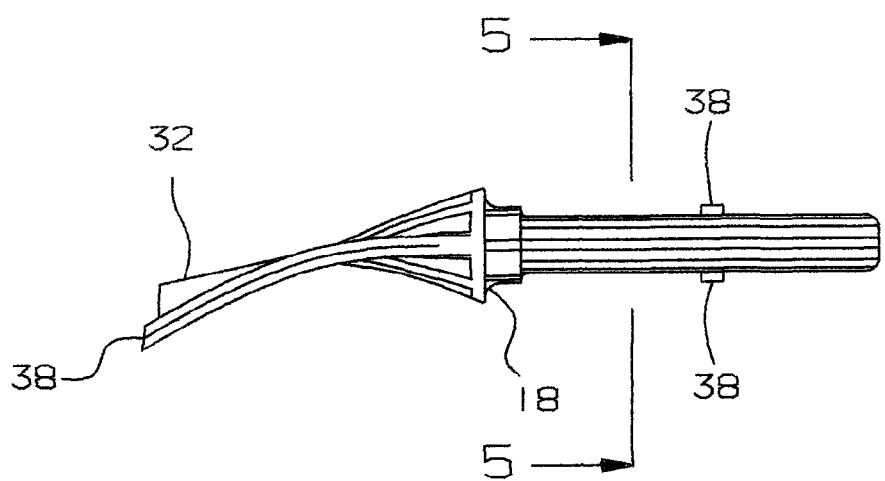
FIG. 4 is side elevational view of the scraper member shown in FIG. 3.
Figure 5:
FIG. 5 is an enlarged cross-sectional view taken along line 5-5 of FIG. 4.

Referring to FIG. 1, there is shown the present invention shock absorbing ice scraper referred to generally by the reference numeral 10. The shock absorbing ice scraper 10 is used for removing ice, snow or frost from vehicle windshields and the like. The scraper 10 includes an interchangeable scraper member 12, a longitudinal contour handgrip member 14, a longitudinal rigid insert member 16, a resilient coil spring 18, and a resilient O-ring 20.

Referring to FIGS. 1 through 4, the interchangeable scraper member 12 includes a head portion 22 and an elongated shaft portion 24 integrally formed to a narrow end 26 of the head portion 22 and extends outwardly therefrom. The head portion 22 has an angular ice scraper blade 28 on the wide end 30 and a plurality of spaced apart teeth 32 on a top surface 34 and located adjacent to the ice scraper blade 28. The head portion 22 has a plurality of short spaced apart ribs for strengthening and reinforcing the narrow end 26. The shaft portion 24 is constructed with a plurality of spaced apart longitudinal ribs 36 as shown for reducing cost to produce the scraper member 12. A pair of opposite protruding tabs 38 or flanges 38 (see FIG. 4) are integrally form with one of the ribs 36 and extend outwardly therefrom. These protruding tabs 38 lock the shaft portion 24 in place and restrict the shaft portion 24 from leaving the handgrip member 14. The scraper member 12 may be constructed from plastic material, metal material or other suitable materials for scraping different surfaces as desired.

Figure 8:
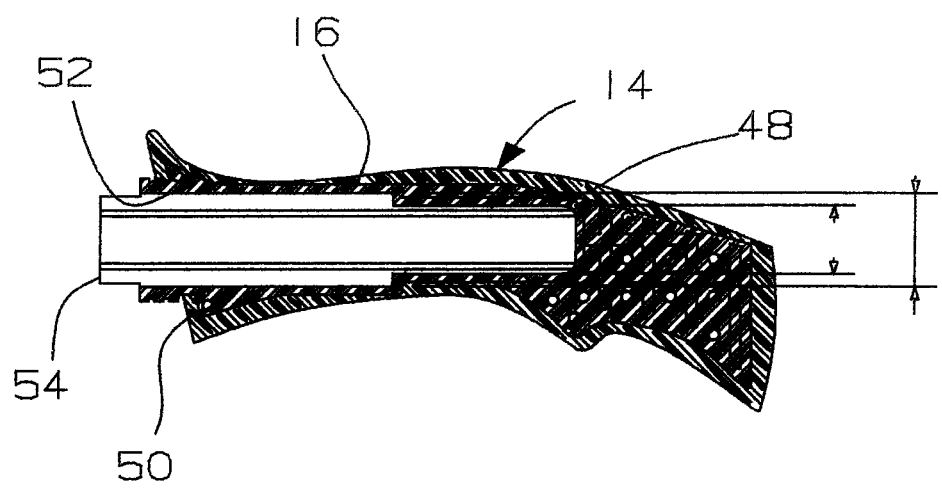
FIG. 8 is a cross-sectional view taken along line 8-8 of FIG. 7.

Referring to FIGS. 1, 2, 7, and 8, the handgrip member 14 is preferably angular or curved. The handgrip member 14 includes a thumb rest 40, a finger separator 42, a closed palm striking end 44, and a curved portion 46 adjacent to the palm striking end 44. As seen in FIGS. 1 and 8, the handgrip member 14 has the curved portion 46 for providing a pushing angle θ for the user's hand. The pushing angle θ may be approximately in the range of 10°-40° for providing a contour feel to the handgrip member 14. The handgrip member 14 has a generally cylindrical bore 48 which is shaped with a unique locking mechanism as shown in FIG. 8. The handgrip member 14 further has an open end 50 which communicates with the bore 48. The handgrip member 14 may be constructed of rubberize material, thermo plastic or etc. for further providing an absorbing means to the impact force.

Figure 9:
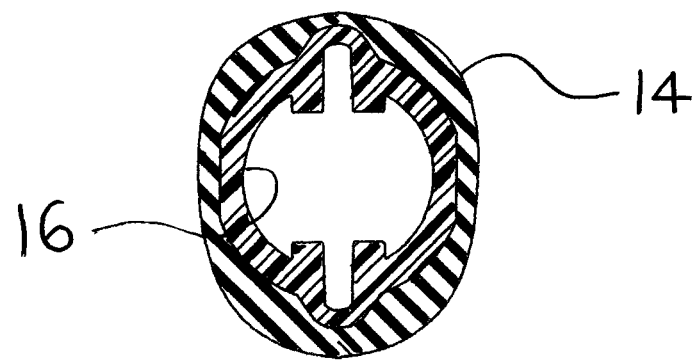
FIG. 9 is an enlarged cross-sectional view taken along line 9-9 of FIG. 7.
Figure 10:
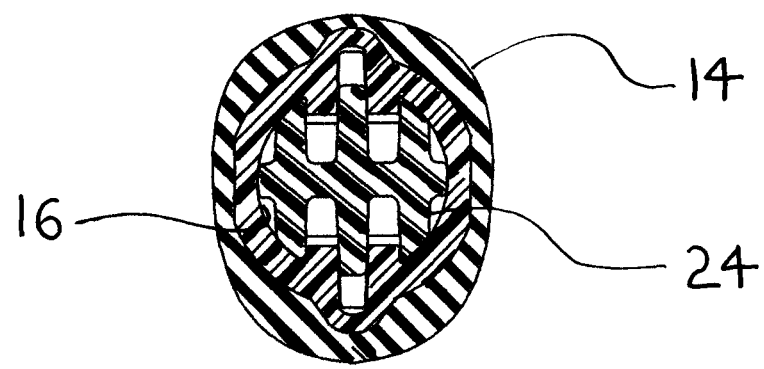
FIG. 10 is an enlarged cross-sectional view taken along line 10-10 of FIG. 2.

Referring to FIGS. 7, 8, 9, and 10, the insert member 16 has a generally cylindrical shaped bore 52 which communicates with an open end 54 and means for preventing transverse movement of the shaft portion 24 of the scraper member 12 within the cylindrical bore 48 of the handgrip member 14. The insert member 16 further has an exterior shaped structure that corresponds with the interior of the bore 48 of the handgrip member 14 for providing the unique locking mechanism as shown in FIGS. 9 and 10. The insert member 16 is press-fitted or over molded within the bore 48 of the handgrip member 14 such that the open end 54 extends partially out from the handgrip member 14. The insert member 16 has slotted openings thereto so that the protruding tabs 38 of the shaft portion 24 can be slide thereto and restrict the movement of the scraper member 12. What is also unique about the shock absorbing ice scraper 10 is the interlocking mechanism between the shaft portion 24 of the scraper member 12, the insert member 16, and the handgrip member. FIGS. 9 and 10 show the interlocking mechanism between these three parts of the shock absorbing ice scraper 10.

The resilient coil spring 18 is fitted between the open end 54 of the insert member 16 and the narrow end 26 of the head portion 22 for absorbing the impact force of the reciprocation movement of the head portion 22 of the scraper member 12. What is also unique about the present invention shock absorbing ice scraper is that the coil spring 18 is also utilized as an energy absorber, displacement of the impact force over time, and reduction of stress to the user's hand.

Figure 6:
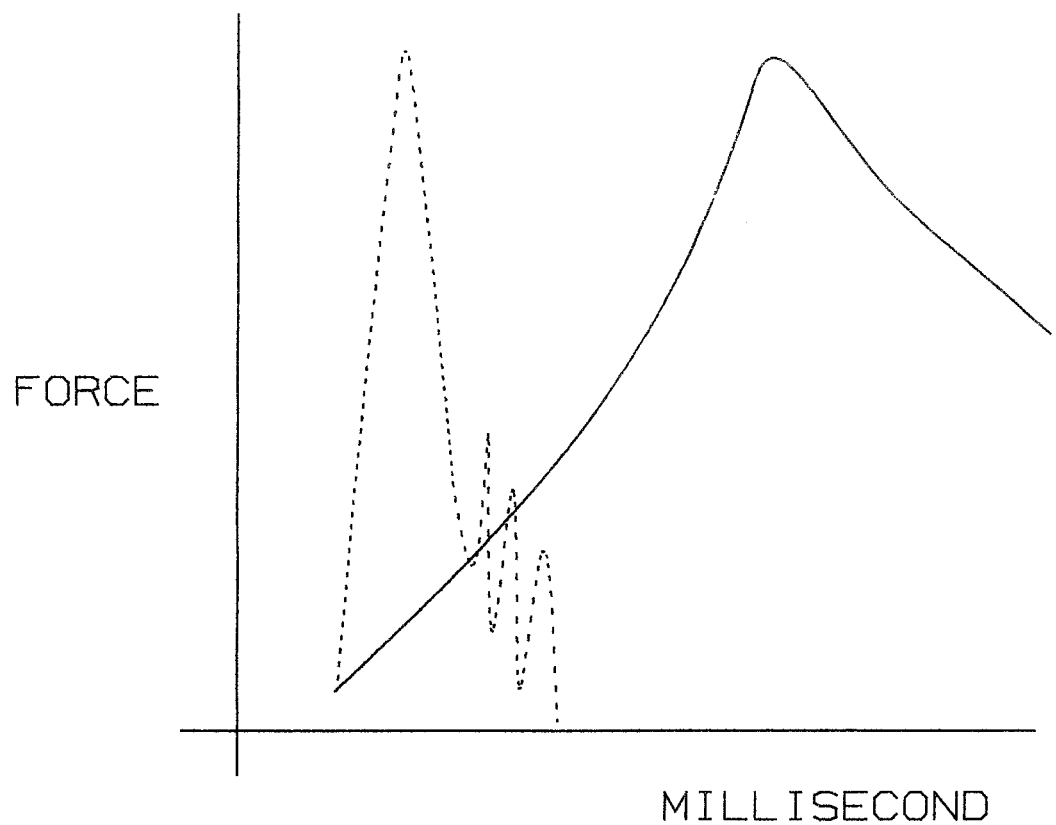
FIG. 6 is a graph showing an impact force over time.
Figure 7:
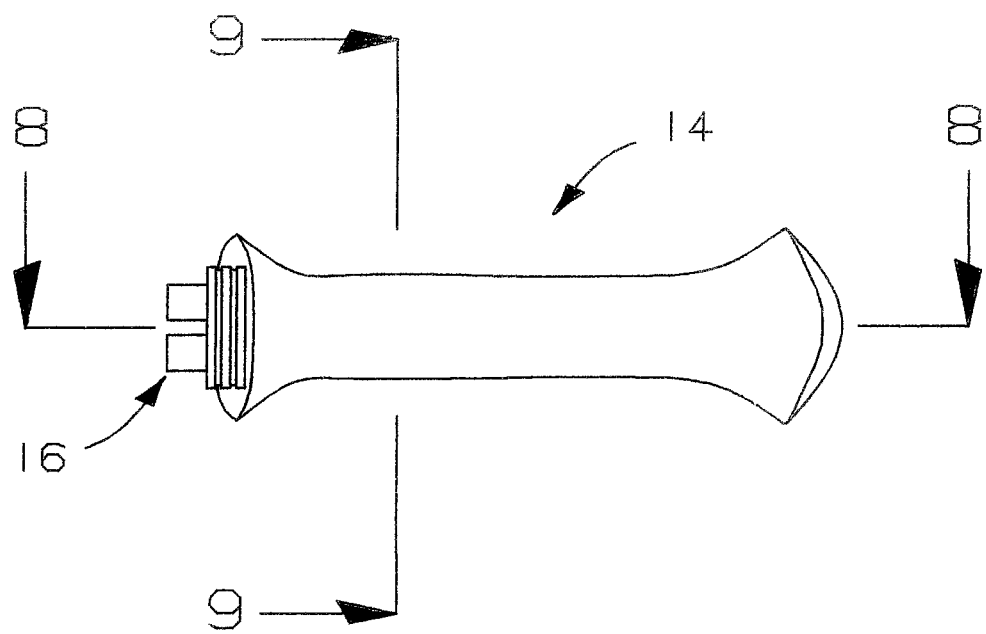
FIG. 7 is a top plan view of the insert member and the handgrip member of the present invention shock absorbing ice scraper.

FIG. 6 shows a graph of the impact force of a conventional ice scraper and the impact force of the present invention shock absorbing ice scraper. The dashed line shows the impact force immediately on the conventional ice scraper while the solid line shows the impact force of the present invention shock absorbing ice scraper over time and dissipates over time as shown.

The resilient O-ring 20 is captured between the narrow end 26 of the head portion 22 and the coil spring 18 to further absorbs the impact force of the head portion 22 of the scraper member 12. The O-ring 20 may be a circular member and constructed of rubber material, plastic material or other suitable materials.

Figure 11:
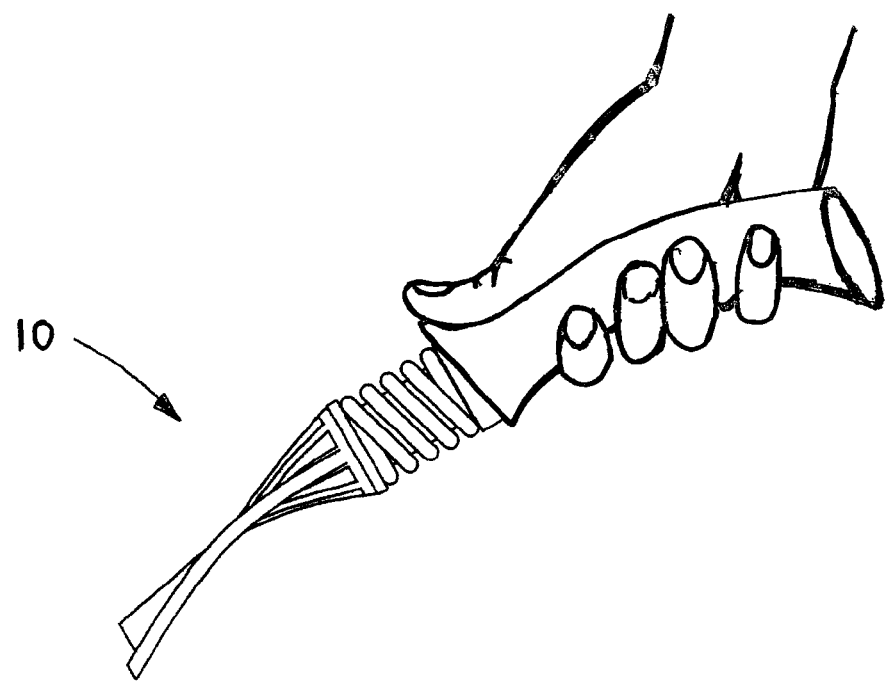
FIG. 11 is a side elevational view of the present invention shock absorbing ice scraper showing a push position.
Figure 12:
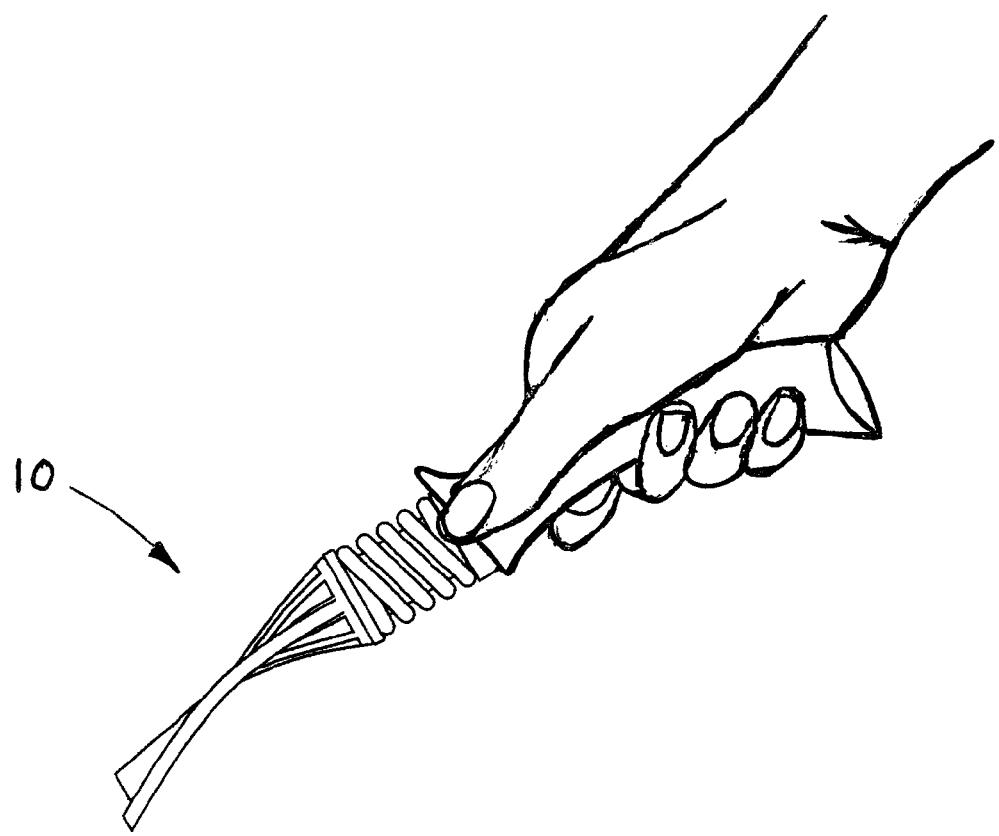
FIG. 12 is a side elevational view of the present invention shock absorbing ice scraper showing a push position in another hand position.
Figure 13:
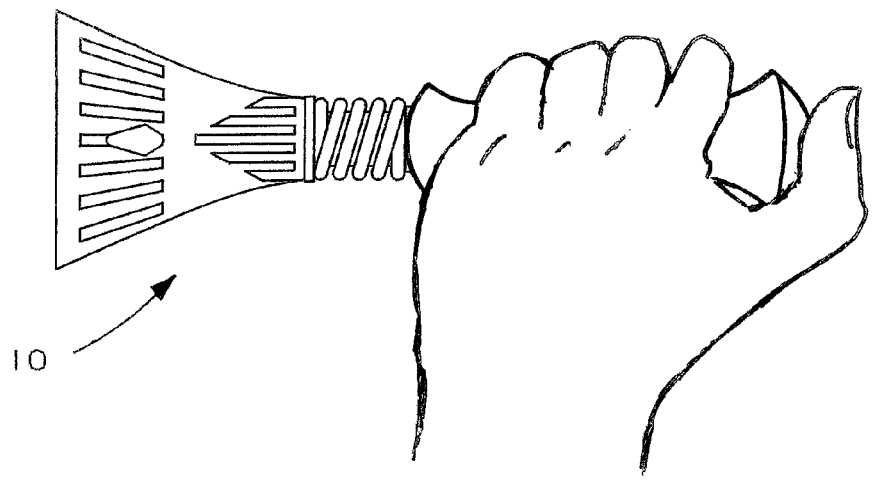
FIG. 13 is a side elevational view of the present invention ice scraper showing a single-handed side chisel position.
Figure 14:
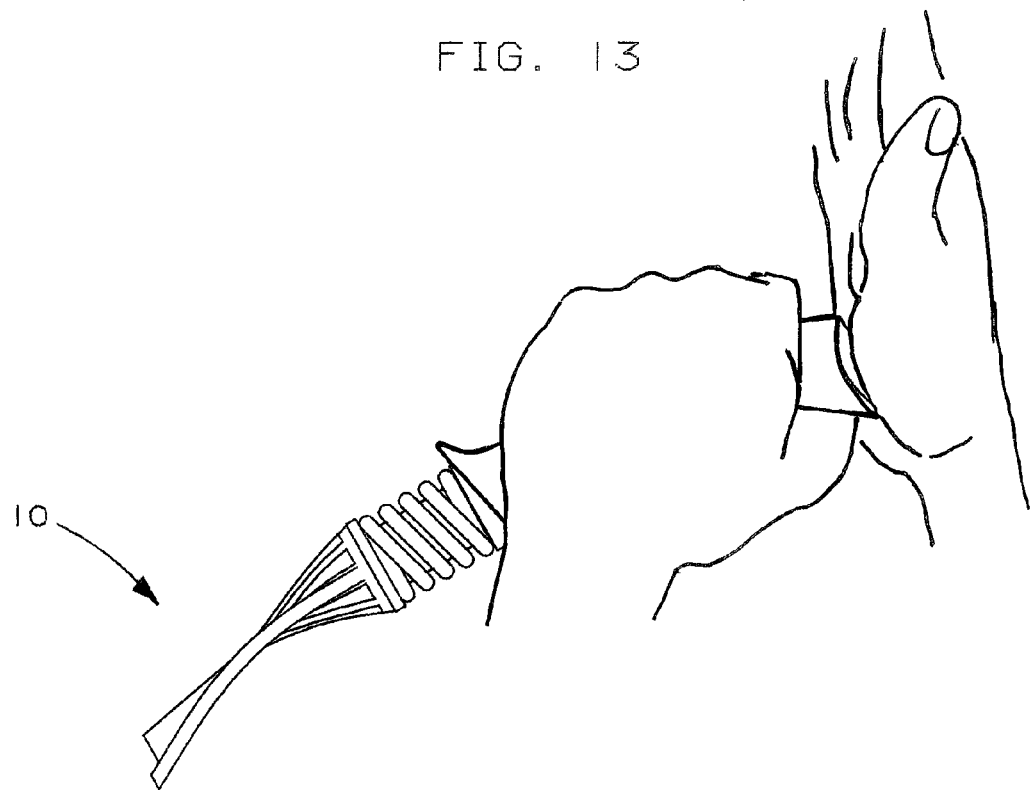
FIG. 14 is a side elevational view of the present invention ice scraper showing a two-handed side chisel position.
Figure 15:
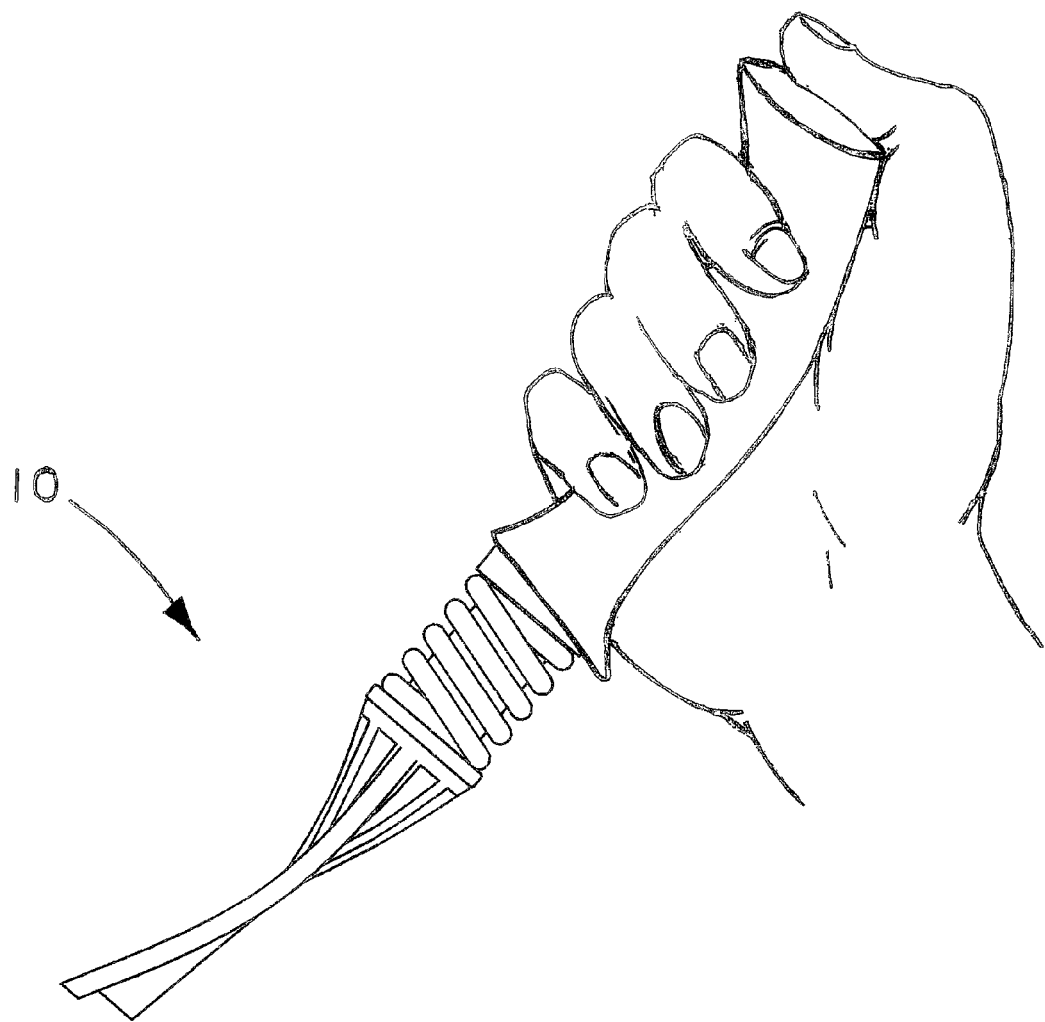
FIG. 15 is a side elevational view of the present invention shock absorbing ice scraper showing a single-handed down chisel position.
Figure 16:
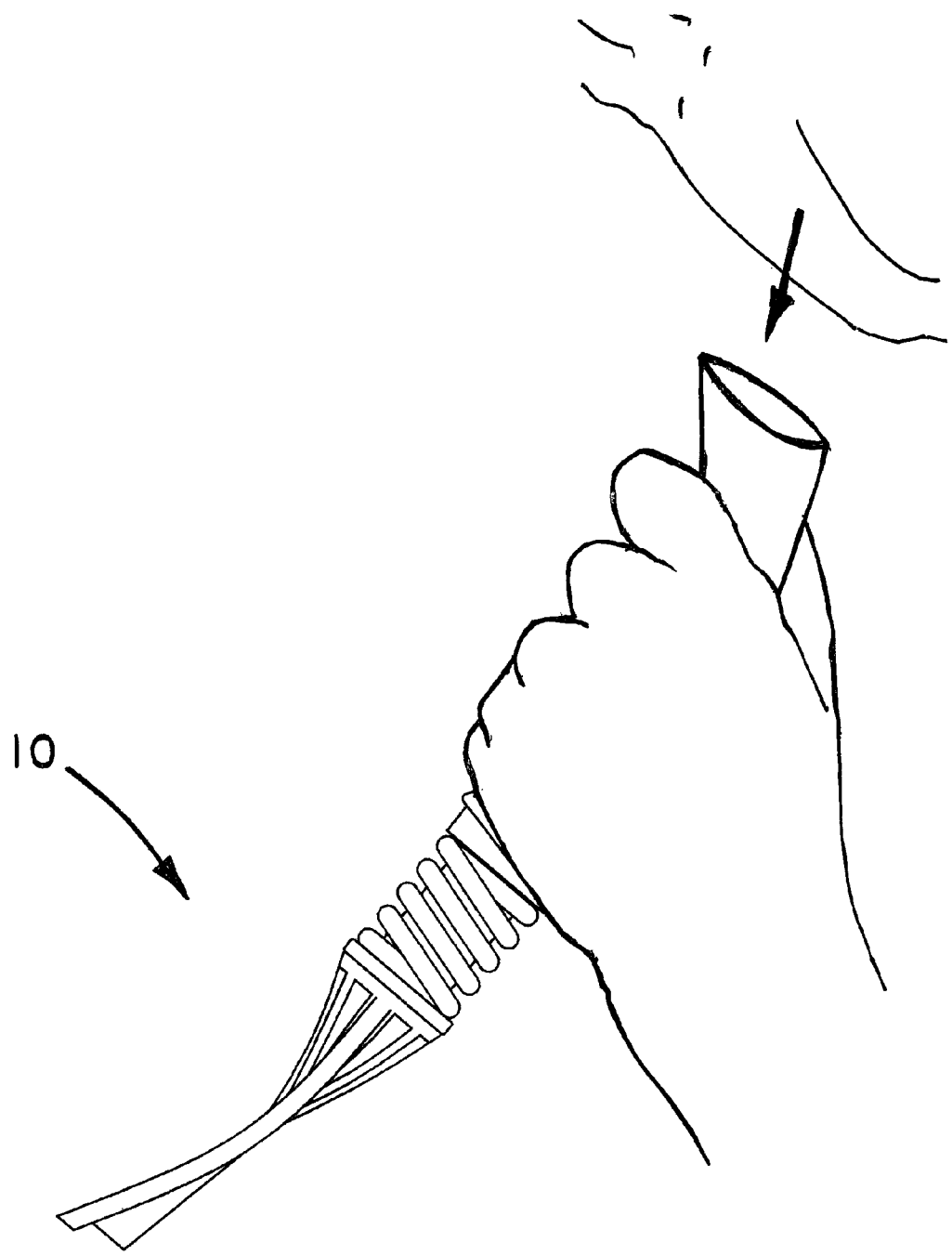
FIG. 16 is a side elevational view of the present invention ice scraper showing a two-handed down chisel position.

The present invention shock absorbing ice scraper 10 can be utilized in many different positions as shown in FIGS. 11 through 16. FIG. 11 shows the shock absorbing ice scraper 10 with a user's hand 2 in a push position. FIG. 12 shows the shock absorbing ice scraper 10 with the user's hand 2 in a rotating push position. FIG. 13 shows the shock absorbing ice scraper 10 with the user's hand 2 in a single-handed side chisel position. FIG. 14 shows the shock absorbing ice scraper 10 with the user's hand 2 in a two-handed side chisel position. FIG. 15 shows the shock absorbing ice scraper 10 with the user's hand 2 in a single-handed down chisel position. FIG. 16 shows the shock absorbing ice scraper 10 with the user's hand 2 in a two-handed down chisel position.

Referring to FIGS. 17 and 18, there is shown the present invention shock absorbing ice scarper 10 which can be utilized with an extension pole 110. One end 112 of the extension pole 110 may be conformed to the handgrip member 14 of the ice scraper 10 while the other end 114 may have a cleaning blade or etc. 150.

Figure 19:
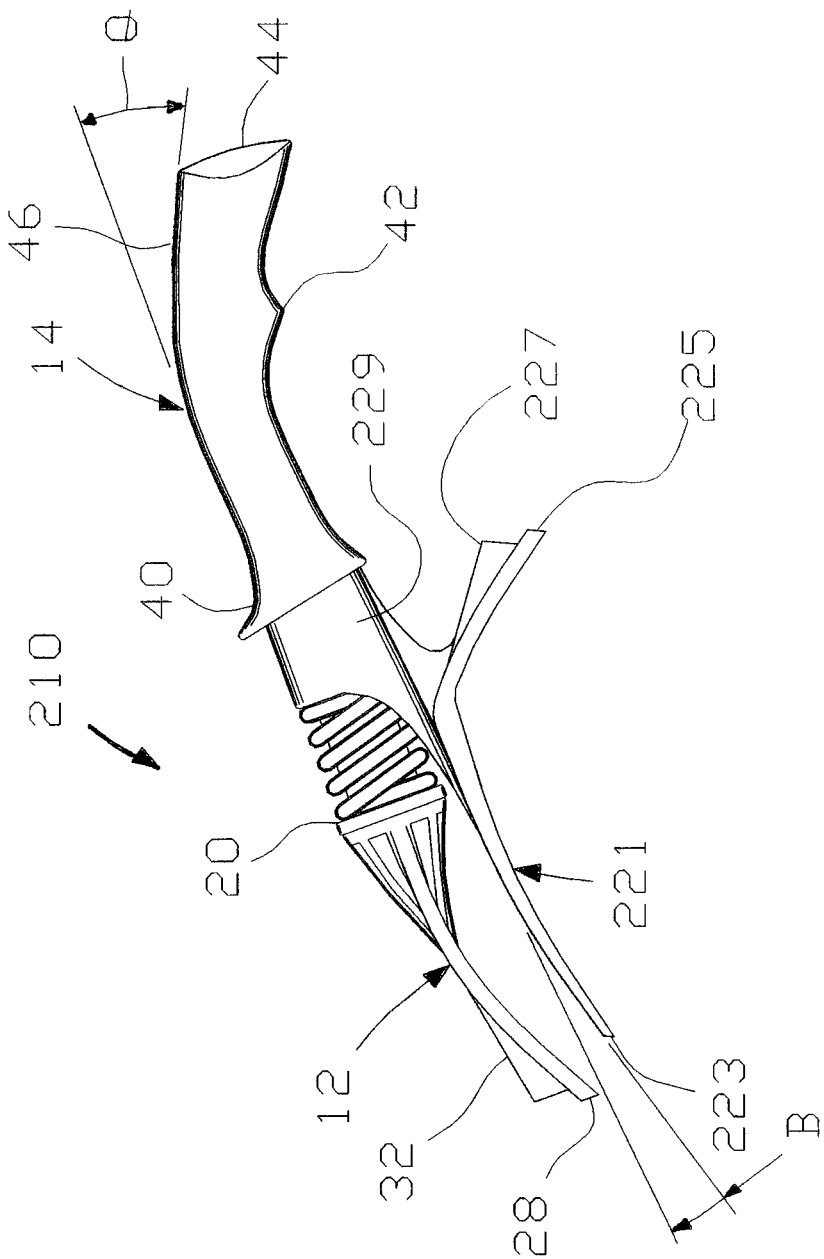
FIG. 19 is a side elevational view of the present invention push and pull shock absorbing scraper.
Figure 20:
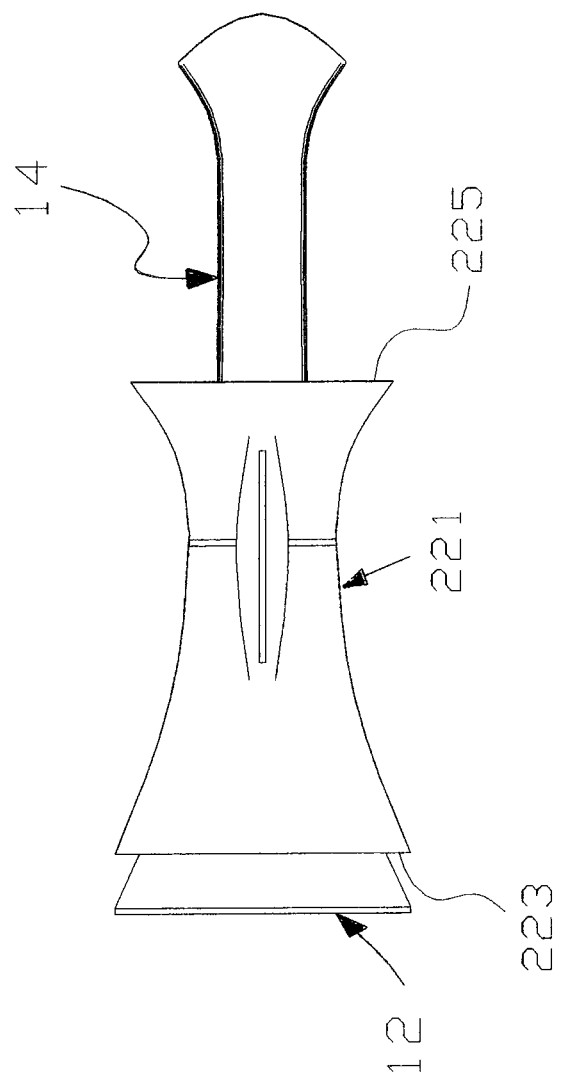
FIG. 20 is a bottom plan view of the push and pull shock absorbing scraper shown in FIG. 19.

Referring to FIGS. 19 through 24, there is shown an improvement of the present invention push and pull shock absorbing scraper 210 for selective scraping by a push and pull action. In this embodiment, the push and pull shock absorbing scraper 210 assembles and functions similarly to the previously described embodiment above except that the shock absorbing scraper includes a lower scraper member 221. FIGS. 19 though 24 will be used to describe another embodiment of the present invention push and pull shock absorbing scraper 210. In addition, all of the parts of this embodiment which are the same as the previous embodiment have the same reference numbers as shown in FIGS. 1 through 18. The new parts are numbered with new reference numbers starting with 200.

The push and pull shock absorbing scraper 210 includes an interchangeable upper scraper member 12, a longitudinal contour handgrip member 14, a longitudinal rigid insert member 16, a resilient coil spring 18, and a resilient O-ring 20.

The interchangeable upper scraper member 12 includes a head portion 22 and an elongated shaft portion 24 integrally formed to a narrow end 26 of the head portion 22 and extends outwardly therefrom. The head portion 22 has an angular scraper blade 28 on the wide end 30 and a plurality of spaced apart teeth 32 on a top surface 34 and located adjacent to the scraper blade 28. The head portion 22 has a plurality of short spaced apart ribs for strengthening and reinforcing the narrow end 26. The shaft portion 24 is constructed with a plurality of spaced apart longitudinal ribs 36 as shown for reducing cost to produce the scraper member 12. A pair of opposite protruding tabs or flanges 38 (see FIG. 4) are integrally form with one of the ribs 36 and extend outwardly therefrom. These protruding tabs 38 lock the shaft portion 24 in place and restrict the shaft portion 24 from leaving the handgrip member 14. The scraper member 12 may be constructed from plastic material, metal material or other suitable materials for scraping different surfaces as desired.

The handgrip member 14 is preferably angular or curved. The handgrip member 14 includes a thumb rest 40, a finger separator 42, a closed palm striking end 44, and a curved portion 46 adjacent to the palm striking end 44. The handgrip member 14 has the curved portion 46 for providing a pushing angle θ for the user's hand. The pushing angle θ may be approximately in the range of 10°-40° for providing a contour feel to the handgrip member 14. The handgrip member 14 has a generally cylindrical bore 48 which is shaped with a unique locking mechanism. The handgrip member 14 further has an open end 50 which communicates with the bore 48. The handgrip member 14 may be constructed of rubberize material, thermo plastic or etc. for further providing an absorbing means to the impact force.

The insert member 16 has a generally cylindrical shaped bore 52 which communicates with an open end 54 and means for preventing transverse movement of the shaft portion 24 of the scraper member 12 within the cylindrical bore 48 of the handgrip member 14. The insert member 16 further has an exterior shaped structure that corresponds with the interior of the bore 48 of the handgrip member 14 for providing the unique locking mechanism. The insert member 16 is press-fitted or over molded within the bore 48 of the handgrip member 14 such that the open end 54 extends partially out from the handgrip member 14. The insert member 16 has slotted openings thereto so that the protruding tabs 38 of the shaft portion 24 can be slide thereto and restrict the movement of the scraper member 12.

The resilient coil spring 18 is fitted between the open end 54 of the insert member 16 and the narrow end 26 of the head portion 22 for absorbing the impact force of the reciprocation movement of the head portion 22 of the scraper member 12. What is also unique about the present invention shock absorbing ice scraper is that the coil spring 18 is also utilized as an energy absorber, displacement of the impact force over time, and reduction of stress to the user's hand.

Figure 21:
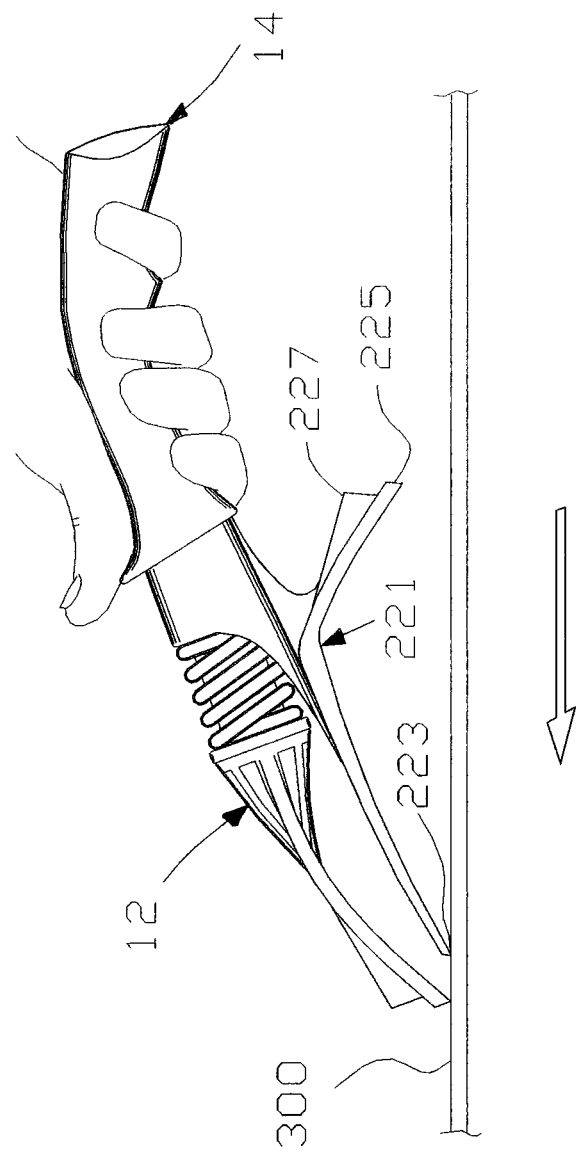
FIG. 21 is a side elevational view of the push and pull shock absorbing scraper shown in FIG. 19 showing the pushing action of the scraper.
Figure 22:
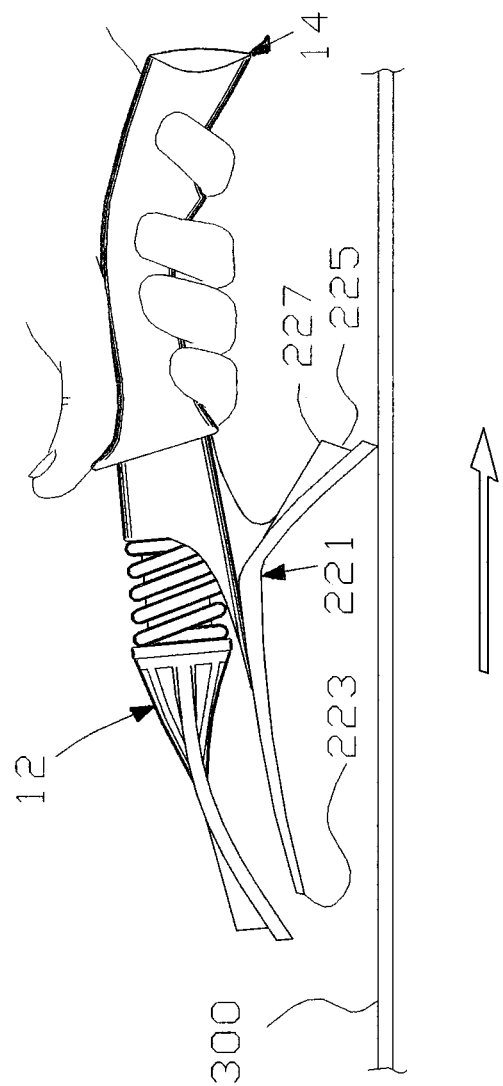
FIG. 22 is a side elevational view of the push and pull shock absorbing scraper shown in FIG. 19 showing the pulling action of the scraper.
Figure 23:
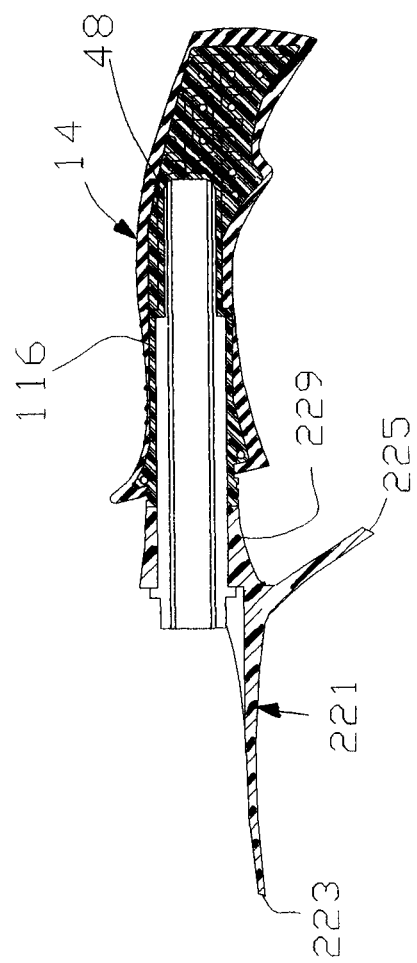
FIG. 23 is a longitudinal cross-sectional view of the present invention shown in FIG. 19, showing an interlocking mechanism of the lower scraper member.
Figure 24:
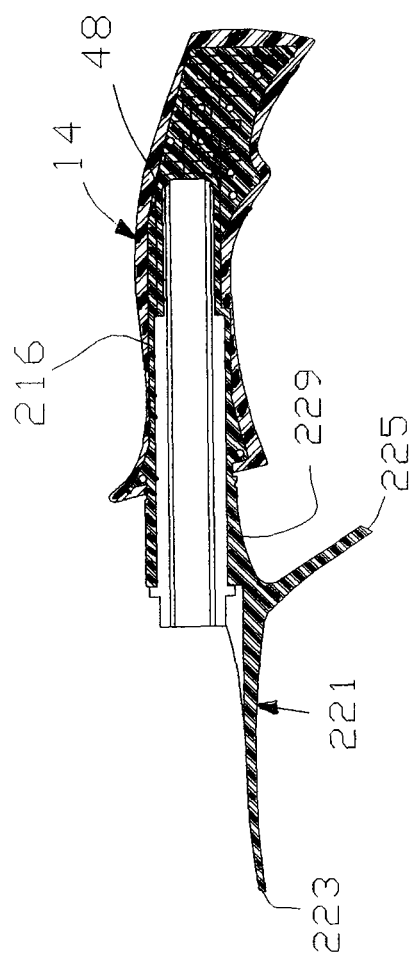
FIG. 24 is a longitudinal cross-sectional view of the present invention shown in FIG. 19, showing the lower scraper member integrally attached.

The resilient O-ring 20 is captured between the narrow end 26 of the head portion 22 and the coil spring 18 to further absorbs the impact force of the head portion 22 of the scraper member 12. A lower or second scraper member 221 can be integrally connected (see FIG. 24) or attached (see FIG. 23) to the shaft portion 24 of the upper scraper member 12 to provide a double push scraping action as shown in FIG. 21. The lower scraper member 221 can be attached by an interlocking mechanism shown previously in FIGS. 9 and 10. The lower scraper member 221 includes a flexible front push blade 223, a rear pull blade 225 and an attachment portion 229. The front push blade 223 is disposed for push action scraping engagement against a work-piece 300 and extends outwardly and transversely to the scraper blade 28 of the upper scraper member 12. The rear pull blade 225 is disposed for pull action scraping engagement against the work-piece 300 (see FIG. 22) and projects transversely and parallel to the push blade 223. The upper surface of the rear pull blade 225 has a plurality of spaced apart ribs 227 for strengthening and reinforcing the rear pull blade 225. The attachment portion 229 can be integrally connected (see FIG. 24) or attached by conventional means (see FIG. 23). What is unique about the push and pull shock absorbing scraper 210 is the double push scraping action as shown in FIG. 19 and the pull scraping action shown in FIG. 22.

The upper and lower scraper members 12 and 221 are separated by an angle β in the range of approximately 5°-20° for providing a flexible pushing action. The lower scraper 221 may be constructed from semi-rigid plastic material or other suitable materials for scraping different surfaces as desired and providing flexibility of the push blade 223 to bend as desired.

Figure 25A:
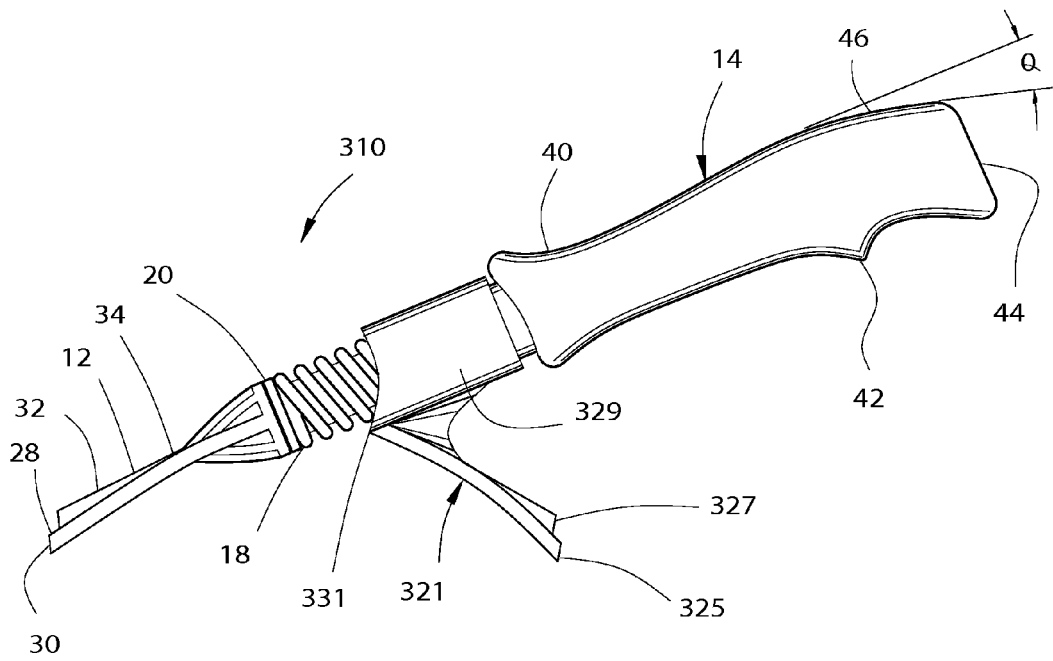
FIG. 25A is a side elevational view of a shock absorbing tool in an uncompressed configuration in accordance with the present invention.
Figure 25B:
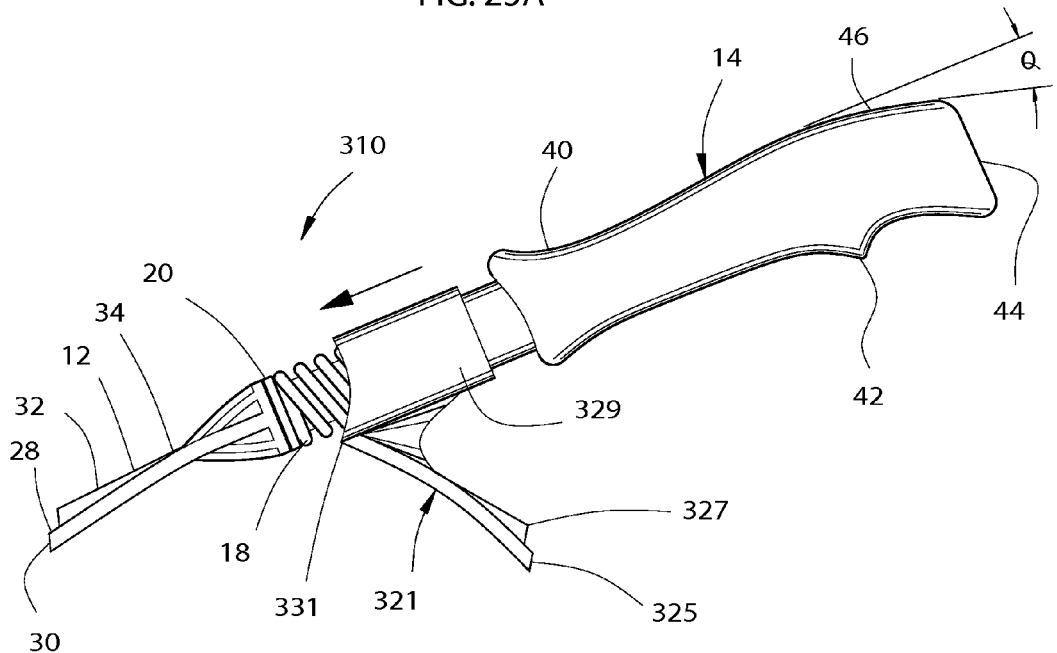
FIG. 25B is a side elevational view of the shock absorbing tool in a compressed configuration in accordance with the present invention.
Figure 26A:
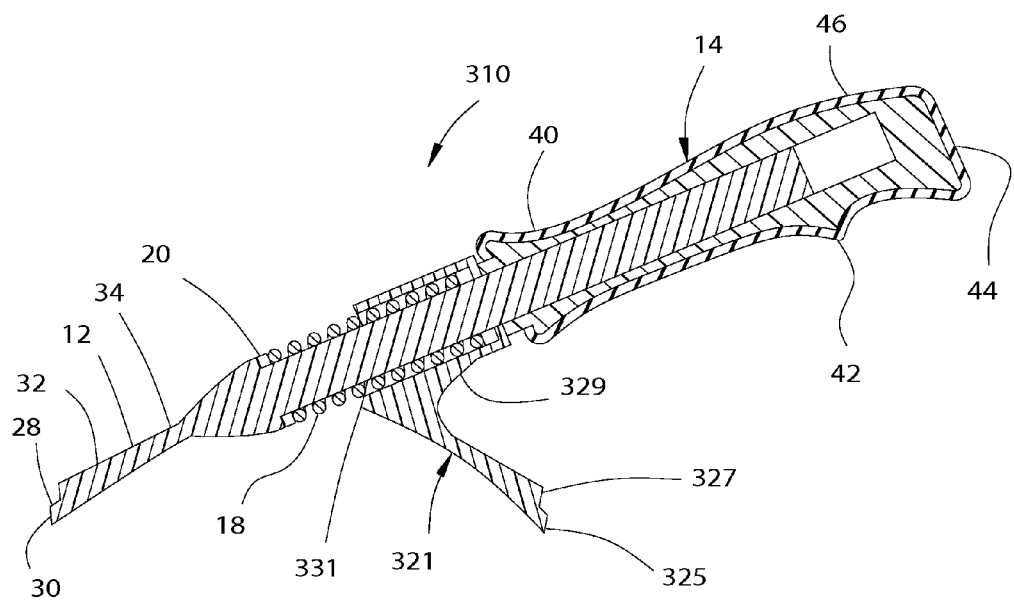
FIG. 26A is a longitudinal cross-sectional view of the shock absorbing tool shown in FIG. 25A.
Figure 26B:
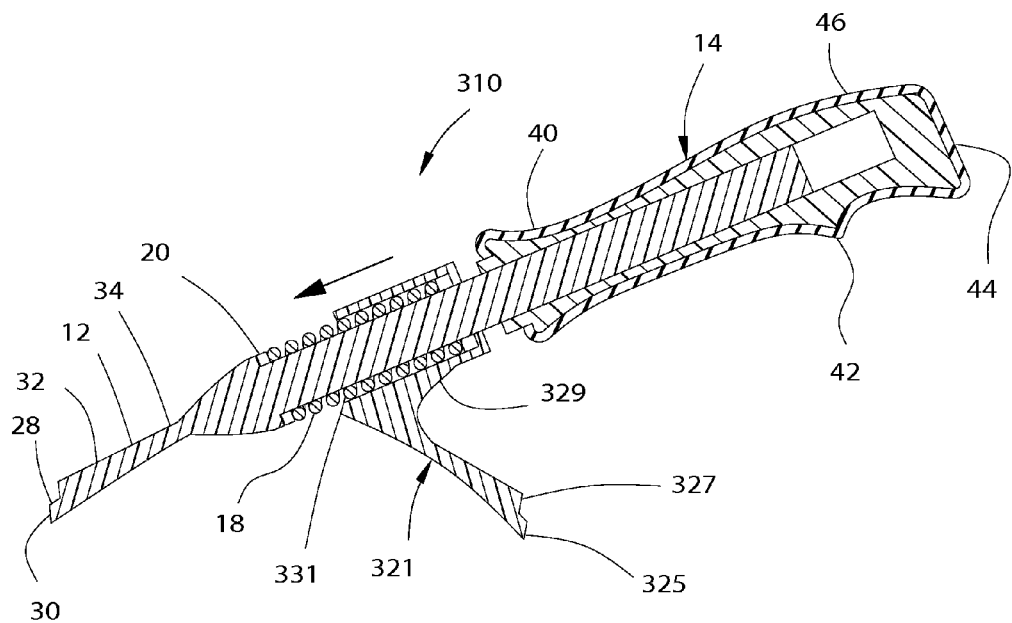
FIG. 26B is a longitudinal cross-sectional view of the shock absorbing tool shown in FIG. 25B.

Referring to FIGS. 25A, 25B, 26A, and 26B, there is illustrated an embodiment of the present invention shock absorbing tool 310. FIGS. 25A and 26A illustrate the shock absorbing tool 310 in an unengaged or uncompressed configuration. FIGS. 25B and 26B illustrate the shock absorbing tool 310 in an engaged or compressed configuration where the coil spring is compressed to absorb the impact force of the shock absorbing tool 310.

In this embodiment, the shock absorbing tool 310 assembles and functions similarly to the previously described embodiment above except that the shock absorbing tool 310 includes a lower rear engagement member 321. In addition, all of the parts in this embodiment which are the same as the previous embodiment have the same reference numbers as shown in FIGS. 1 through 18. The new parts are numbered with new reference numbers starting with 300.

The shock absorbing tool 310 includes a forward engagement member 12, a longitudinal contour handgrip member 14, a longitudinal rigid insert structure 16, a resilient coil spring 18, and a resilient O-ring 20.

The forward engagement member 12 includes an engagement head 22 and an elongated shaft 24 integrally formed to a proximal end 26 of the engagement head 22 and extends outwardly therefrom. The engagement head 22 has an angular wedge blade 28 on the distal end 30 and a plurality of spaced apart teeth 32 on a top surface 34 and located adjacent to the wedge blade 28. The head 22 has a plurality of short spaced apart ribs for strengthening and reinforcing the head 22. The shaft 24 is constructed with a plurality of spaced apart longitudinal ribs as shown for reducing cost to produce the forward engagement member 12. A pair of opposite protruding tabs or flanges 38 (see FIG. 4) are integrally form with one of the ribs and extend outwardly therefrom. These protruding tabs 38 lock the shaft 24 in place and restrict the shaft 24 from moving within the handgrip 14. The forward engagement member 12 may be constructed from plastic material, metal material or other suitable materials for working on different work surfaces as desired.

The handgrip 14 is preferably angular or curved. The handgrip 14 includes a thumb rest 40, a finger separator 42, a closed palm striking end 44, and a curved portion 46 adjacent to the palm striking end 44. The handgrip 14 has the curved portion 46 for providing a pushing angle θ for the user's hand. The pushing angle θ may be approximately in the range of 10°-40° for providing a contour feel to the handgrip 14. The handgrip 14 has a generally cylindrical bore 48 which is shaped with a unique locking mechanism. The handgrip 14 further has an open end 50 which communicates with the bore 48. The handgrip 14 may be constructed of rubberize material, thermo plastic or etc. for further providing absorbing means to the impact force of the shock absorbing tool 310.

The insert structure 16 has a generally cylindrical shaped bore 52 which communicates with an open end 54 and means for preventing transverse and longitudinal movements of the shaft 24 of the forward engagement member 12 within the cylindrical bore 48 of the handgrip 14. The insert structure 16 further has an exterior shaped structure that corresponds with the interior of the bore 48 of the handgrip 14 for providing the unique locking mechanism. The insert structure 16 is press-fitted or over molded within the bore 48 of the handgrip 14 such that the open end 54 extends partially out from the handgrip 14. The unique locking mechanism includes slotted openings on the insert structure 16 where the protruding tabs 38 of the shaft 24 are engaged with the slotted openings and restrict the transverse movement of the forward engagement member 12 and further limit the longitudinal movement.

The resilient coil spring 18 is installed and surrounded a portion of the shaft 24 and between the open end 54 of the insert structure 16 and the proximal end 26 of the engagement head 22 for absorbing the impact force of the reciprocation movement of the head 22 of the forward engagement member 12. What is unique about the present invention shock absorbing tool 310 is that the coil spring 18 is also utilized as an energy absorber, displacement of the impact force over time, and reduction of stress to the user's hand.

The O-ring 20 is installed and captured between the proximal end 26 of the head 22 and the upper end of the coil spring 18 to further absorbs the impact force of the head 22 of the forward engagement member 12 and a rear engagement member 321. The rear engagement member 321 includes a cylindrical shaped sleeve or collar 329 and a flexible wedge blade 325 integrally connected to a proximal end 331 of the sleeve 329. The sleeve 329 is slidably installed and surrounded a portion of the shaft 24 of the forward engagement member 12 to provide a pulling or backward stroke action.

The rear engagement member 321 can be attached by an interlocking mechanism shown previously in FIGS. 9 and 10. The rear engagement member 321 is disposed for pulling or backward engagement against the work-piece and projects transversely and parallel to the wedge blade 28 of the forward engagement member 12. The upper surface of the wedge blade 325 has a plurality of spaced apart ribs which extend to the proximal end 331 of the sleeve 329 for strengthening and reinforcing the wedge blade 325. The rear engagement member 321 may be constructed from semi-rigid plastic material or other suitable materials for working on different surfaces as desired and providing flexibility of the wedge blade 325 to bend as desired.

Figure 27A:
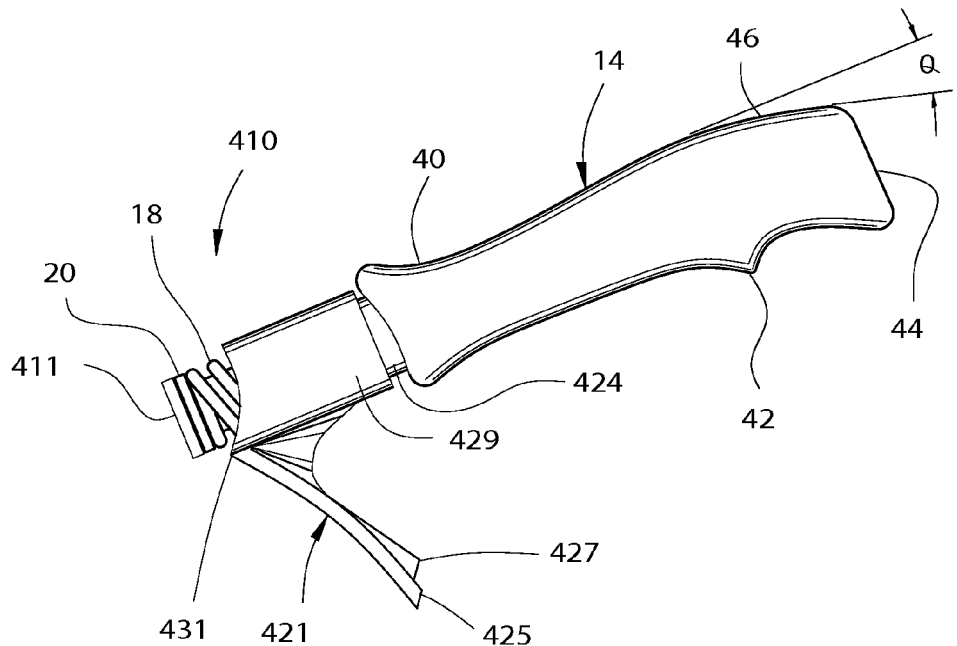
FIG. 27A is a side elevational view of an alternate embodiment of a shock absorbing tool in an uncompressed configuration in accordance with the present invention.
Figure 27B:
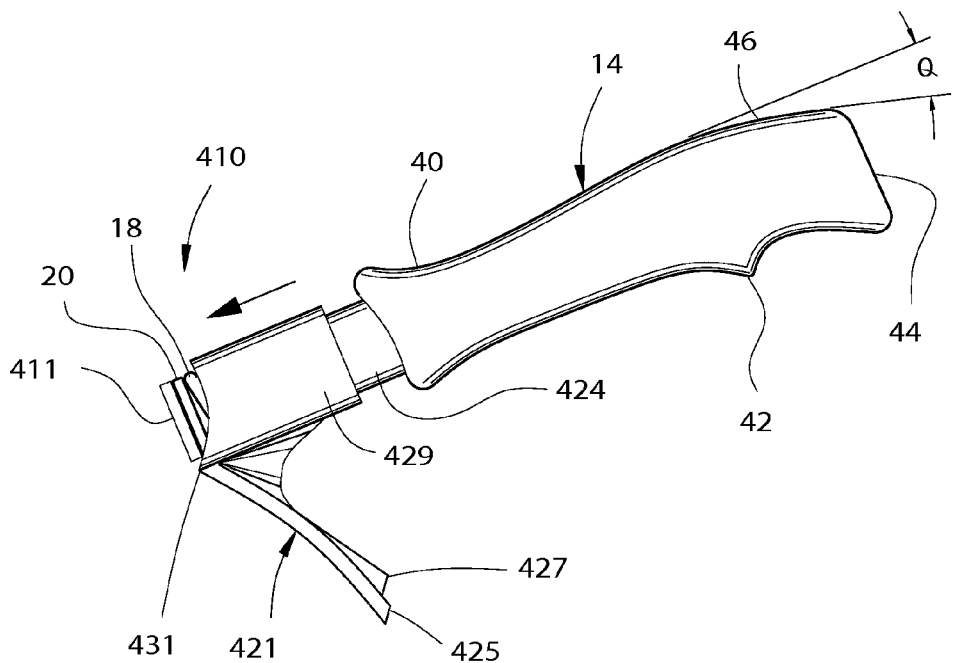
FIG. 27B is a side elevational view of the shock absorbing tool shown in FIG. 27A in a compressed configuration.
Figure 28A:
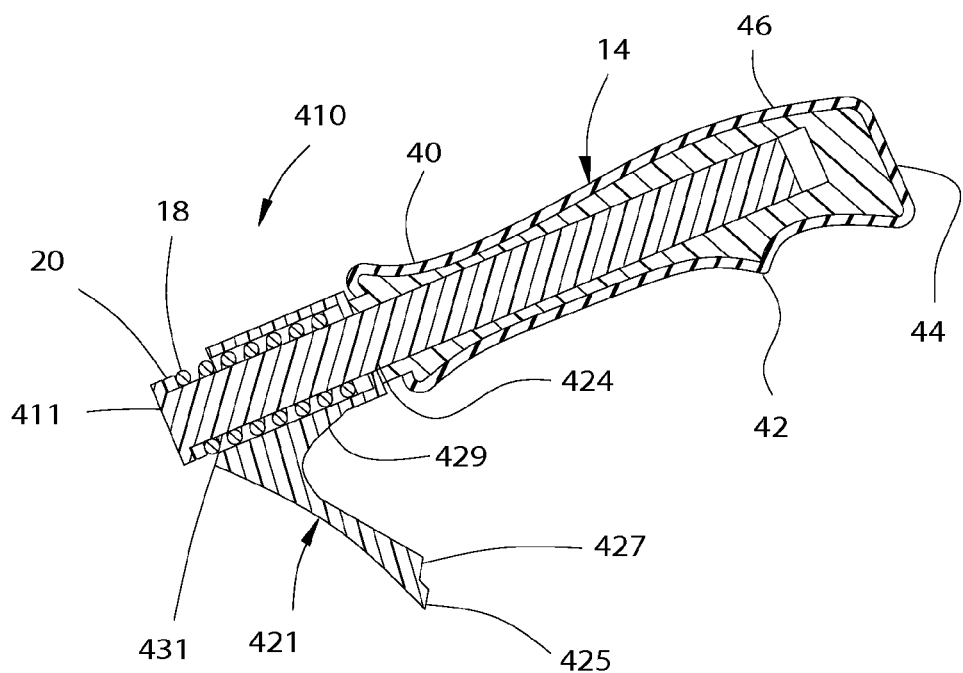
FIG. 28A is a longitudinal cross-sectional view of the shock absorbing tool shown in FIG. 27A.
Figure 28B:
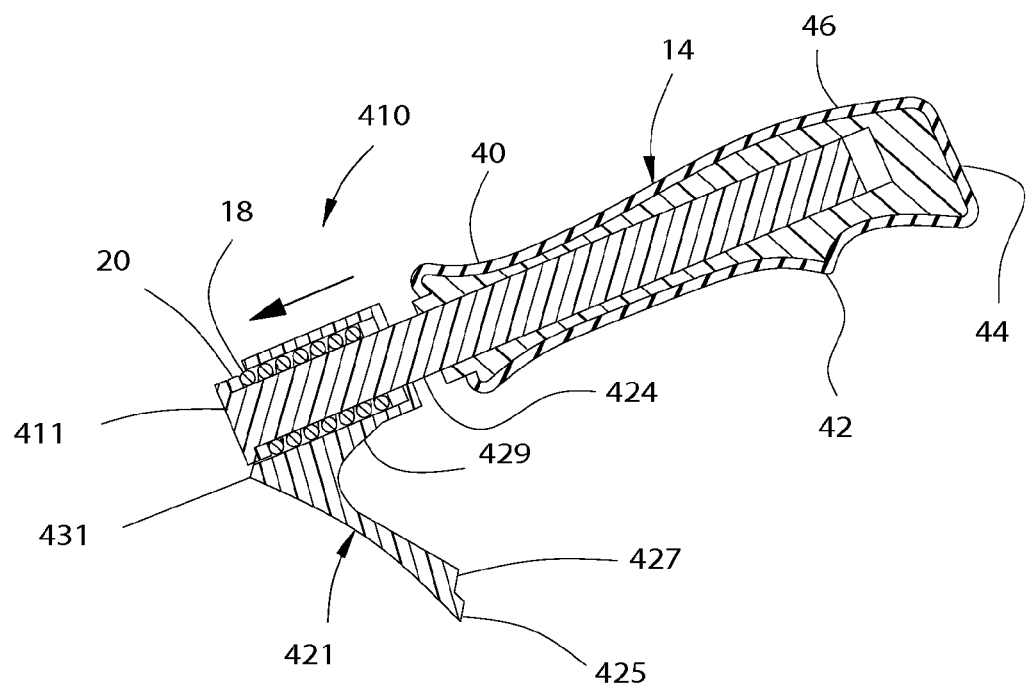
FIG. 28B is a longitudinal cross-sectional view of the shock absorbing tool shown in FIG. 27B.

Referring to FIGS. 27A, 27B, 28A, and 28B, there is illustrated an alternative embodiment of the present invention shock absorbing tool 410. FIGS. 27A and 28A illustrate the shock absorbing tool 410 in an unengaged or uncompressed configuration. FIGS. 27B and 27B illustrate the shock absorbing tool 410 in an engaged or compressed configuration where the coil spring is compressed to absorb the impact force of the shock absorbing tool 410.

In this alternative embodiment, the shock absorbing tool 410 assembles and functions similarly to the previously described embodiment above except that the shock absorbing tool 410 only includes a rear engagement member 421. In addition, all of the parts in this embodiment which are the same as the previous embodiment have the same reference numbers as illustrated in FIGS. 1 through 18. The new parts are numbered with new reference numbers starting with 400.

In this alternative embodiment, the forward engagement member 12 has been removed from the shock absorbing tool 410 and only the rear engagement member 421 is illustrated.

The shock absorbing tool 410 includes an elongated connecting shaft 424, a rear engagement member 421, a longitudinal contour handgrip member 14, a longitudinal rigid insert structure 16, a resilient coil spring 18, and a resilient O-ring 20.

The elongated connecting shaft 424 has an enlarged distal end 411 which acts a cover or stopper for holding the coil spring 18 in place. The connecting shaft 424 is constructed with a plurality of spaced apart longitudinal ribs as illustrated for reducing cost to produce the shaft and saving material cost. A pair of opposite protruding tabs or flanges 38 (see FIG. 4) are integrally form with one of the ribs and extend outwardly therefrom. These protruding tabs 38 lock the shaft connecting 424 in place and restrict the shaft 424 movement within the handgrip 14.

The handgrip 14 is preferably angular or curved. The handgrip 14 includes a thumb rest 40, a finger separator 42, a closed palm striking end 44, and a curved portion 46 adjacent to the palm striking end 44. The handgrip 14 has the curved portion 46 for providing a pushing angle θ for the user's hand. The pushing angle θ may be approximately in the range of 10°-40° for providing a contour feel to the handgrip 14. The handgrip 14 has a generally cylindrical bore 48 which is shaped with a unique locking mechanism. The handgrip 14 further has an open end 50 which communicates with the bore 48. The handgrip 14 may be constructed of rubberize material, thermo plastic or etc. for further providing absorbing means to the impact force of the shock absorbing tool 410.

The insert structure 16 has a generally cylindrical shaped bore 52 which communicates with an open end 54 and means for preventing transverse and longitudinal movements of the connecting shaft 424 within the cylindrical bore 48 of the handgrip 14. The insert structure 16 further has an exterior shaped structure that corresponds with the interior of the bore 48 of the handgrip 14 for providing the unique locking mechanism. The insert structure 16 is press-fitted or over molded within the bore 48 of the handgrip 14 such that the open end 54 extends partially out from the handgrip 14. The unique locking mechanism includes slotted openings on the insert structure 16 where the protruding tabs 38 of the connecting shaft 424 are engaged with the slotted openings and restrict the transverse movement of the connecting shaft 424 and further limit the longitudinal movement.

The resilient coil spring 18 is installed and surrounded an upper portion of the connecting shaft 424 and between the open end 54 of the insert structure 16 and the enlarged distal end 411 for absorbing the impact force of the reciprocation movement of the rear engagement member 421 of the shock absorbing tool 410. What is unique about the present invention shock absorbing tool 410 is that the coil spring 18 may also be utilized as an energy absorber, displacement of the impact force over time, and reduction of stress to the user's hand.

The O-ring 20 is installed and captured between the enlarged distal end 411 of the connecting shaft 424 and the upper end of the coil spring 18 to further absorbs the impact force of the rear engagement member 421. The rear engagement member 321 includes a cylindrical shaped sleeve or collar 429 and a flexible wedge blade 425 integrally connected to a proximal end 431 of the sleeve 429. The sleeve 429 is slidably installed and surrounded an upper portion of the connecting shaft 424 to provide a backward stroke action. The sleeve 429 of the rear engagement member 421 can be attached by an interlocking mechanism shown previously in FIGS. 9 and 10. The rear engagement member 421 is disposed for backward engagement against the work-piece and projects transversely and parallel to a work surface. The upper surface of the rear wedge blade 425 has a plurality of spaced apart ribs which extend to the proximal end 431 of the sleeve 429 for strengthening and reinforcing the wedge blade 425. The rear engagement member 421 may be constructed from semi-rigid plastic material or other suitable materials for working on different surfaces as desired and providing flexibility of the wedge blade 425 to bend as desired.

Figure 29:
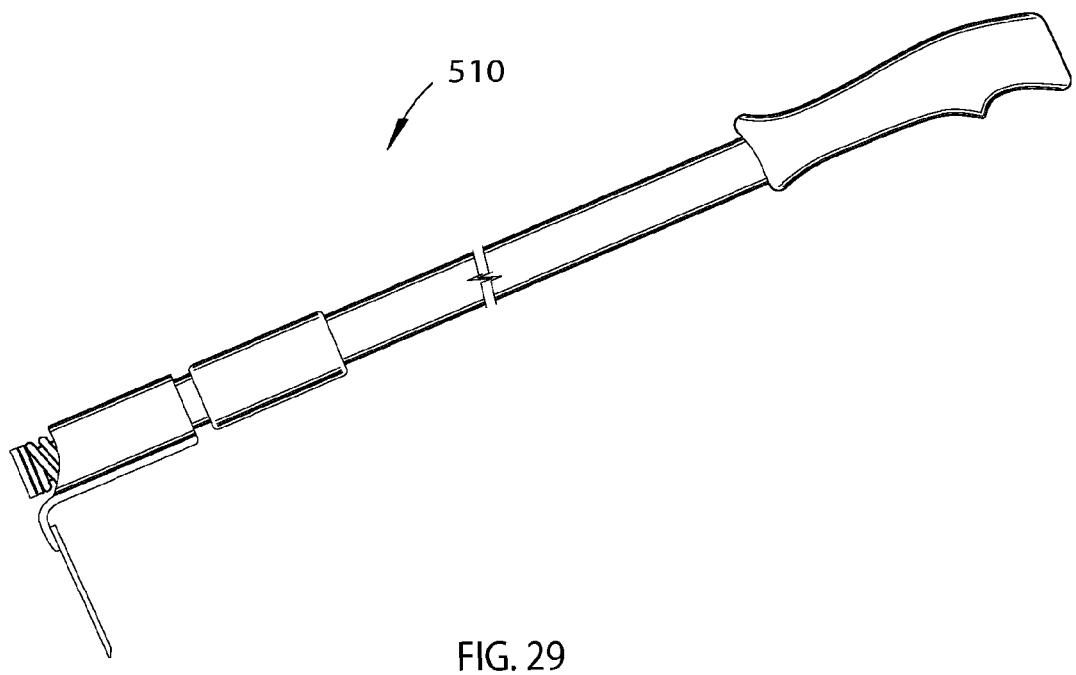
FIG. 29 is a perspective view of a shock absorbing garden hoe tool in accordance with the present invention.

FIG. 29 illustrates another embodiment of the present invention wherein the shock absorbing tool is a garden hoe 510.

Figure 30:
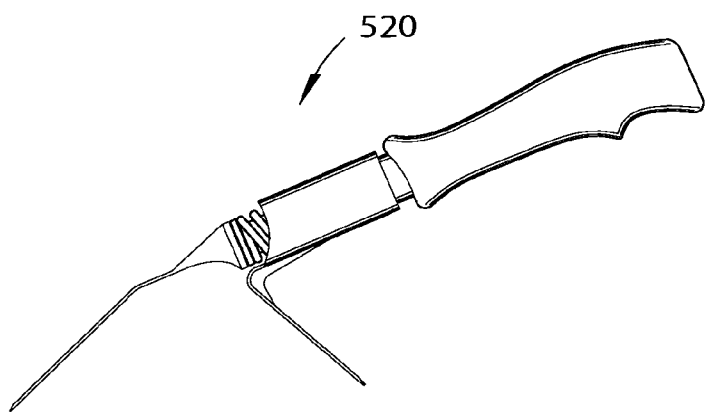
FIG. 30 is a perspective view of a shock absorbing paint scraper tool in accordance with the present invention.

FIG. 30 illustrates another embodiment of the present invention wherein the shock absorbing tool is a paint scraper 520.

Figure 31:
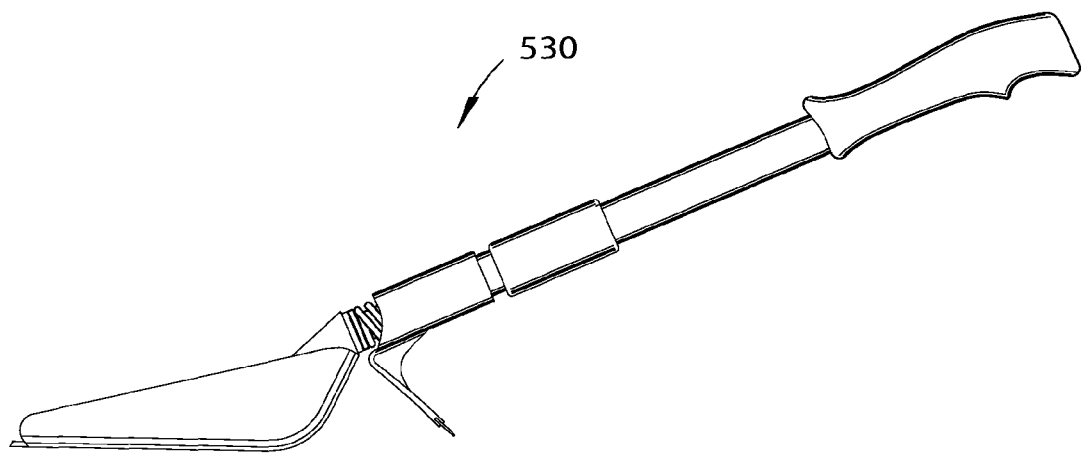
FIG. 31 is a perspective view of a combination shovel and hoe shock absorbing tool in accordance with the present invention.

FIG. 31 illustrates another embodiment of the present invention wherein the shock absorbing tool is a combination shovel and hoe tool 530.

Figure 32:
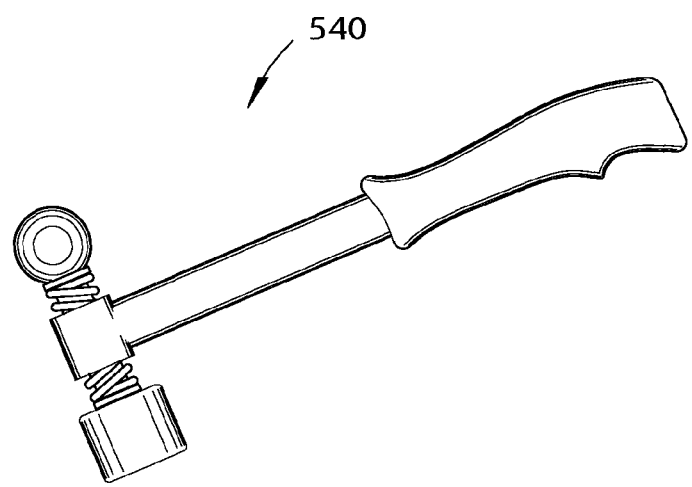
FIG. 32 is a perspective view of a shock absorbing mallet in accordance with the present invention.

FIG. 32 illustrates another embodiment of the present invention wherein the shock absorbing tool is a mallet 540.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A shock absorbing tool, comprising:
    (a) a first engagement member having a head and a shaft connected to a proximal end of the head, the head having a wedge blade distal end;
    (b) a second engagement member having a sleeve and a wedge blade connected to the sleeve at a proximal end and extending downwardly and outwardly from the sleeve, the sleeve slidably installed and surrounding a portion of said shaft of said first engagement member such that the wedge blade is located transversely and parallel to said wedge blade distal end of said first engagement member,
    (c) a handgrip having a bore communicating with an open end;
    (d) an insert member having a bore communicating with an open end and means for preventing transverse and longitudinal movements of said shaft of said first engagement member within said bore of said handgrip, the insert member positioned within said bore of said handgrip; and
    (e) spring means for absorbing the impact of the reciprocation movement of said first engagement member in a forward motion and said second engagement member in a backward motion.

2. The shock absorbing tool of claim 1 further comprising a resilient O-ring located between said proximal end of said head and said spring means for further absorbing the impact of said first and second engagement members.

3. The shock absorbing tool of claim 1, wherein said spring means is a coil spring.

4. The shock absorbing tool of claim 1, wherein said means for preventing transverse and longitudinal movements of said shaft of said first engagement member includes a pair of opposite protruding tabs extending outwardly from said shaft and respectively engaged with a pair of slotted openings of said insert member.

5. A shock absorbing tool for absorbing the impact of the reciprocation movement of the tool in a forward motion and a backward motion, the tool comprising:
    (a) a forward engagement member having a head and a shaft integrally formed with a proximal end of the head, the head having a wedge blade distal end, the shaft having means for preventing transverse and longitudinal movement of the forward engagement member;
    (b) a rear engagement member having a sleeve and a wedge blade integrally formed with the sleeve at a proximal end and extending downwardly and outwardly from the sleeve, the sleeve slidably surrounding a portion of said shaft of said forward engagement member such that the wedge blade is located transversely and parallel to said wedge blade distal end of said forward engagement member;
    (c) a handgrip having a bore communicating with an open end;
    (d) an insert having a bore communicating with an open end and receiving means for receiving said means for preventing transverse and longitudinal movement of the forward engagement member within said bore of said handgrip, the insert member press-fitted within said bore of said handgrip such that the open end extends partially out from said handgrip; and
    (e) spring means located between said open end of said insert and said proximal end of said head for absorbing the impact of the reciprocation movements of said head of said forward engagement member and said wedge blade of said rear engagement member.

6. The shock absorbing tool of claim 5 further comprising a resilient O-ring located between said proximal end of said head and said spring means for further absorbing the impact of said forward and rear engagement members.

7. The shock absorbing tool of claim 5, wherein said spring means is a coil spring.

8. The shock absorbing tool of claim 5, wherein said means for preventing transverse and longitudinal movement of said forward engagement member includes a pair of opposite protruding tabs located on said shaft of said forward engagement member.

9. The shock absorbing tool of claim 8, wherein said receiving means of said insert includes a pair of opposite slotted openings for respectively receiving said pair of opposite protruding tabs of said shaft of said forward engagement member.

10. The shock absorbing tool of claim 5, wherein said handgrip further includes a curved portion to provide a pushing angle for a user's hand.

11. A shock absorbing tool, comprising:
    (a) a connecting shaft having a stopper distal end;
    (b) an engagement member having a sleeve and a wedge blade connected to the sleeve at a proximal end and extending downwardly and outwardly from the sleeve, the sleeve slidably installed and surrounding a portion of said connecting shaft;
    (c) a handgrip member having a bore communicating with an open end;
    (d) an insert member having a bore communicating with an open end and means for preventing transverse and longitudinal movements of said connecting shaft within said bore of said handgrip member, the insert member positioned within said bore of said handgrip member; and
    (e) spring means installed within said sleeve and surrounding a portion of said connecting shaft where one end of the spring means abuts against said stopper distal end for absorbing the impact of the reciprocation movement of said engagement member in a backward motion.

12. The shock absorbing tool of claim 11 further comprising means for preventing transverse movement of said sleeve.

13. The shock absorbing tool of claim 12, wherein said means for preventing transverse movement of said sleeve includes a pair of opposite protruding tabs extending outwardly from said connecting shaft and engaged with a pair of slotted openings within said sleeve.

14. The shock absorbing tool of claim 11, wherein said spring means is a coil spring.

15. The shock absorbing tool of claim 11, wherein said means for preventing transverse and longitudinal movements of said connecting shaft includes a pair of opposite protruding tabs extending outwardly from said shaft and engaged with a pair of slotted openings within said insert member.

16. A shock absorbing tool for absorbing the impact of the reciprocation movement of the tool in a backward motion, the tool comprising:
    (a) a connecting shaft having an enlarged distal end and having means for preventing transverse and longitudinal movements of the connecting shaft;
    (b) a rear engagement member having a sleeve and a wedge blade integrally formed with the sleeve at a proximal end and extending downwardly and outwardly from the sleeve, the sleeve slidably installed and surrounding a portion of said connecting shaft such that the wedge blade is located transversely and parallel to a work surface;
    (c) a handgrip member having a bore communicating with an open end;
    (d) an insert member having a bore communicating with an open end and receiving means for receiving said means for preventing transverse and longitudinal movements of said connecting shaft within said bore of said handgrip member, the insert member press-fitted within said bore of said handgrip member such that the open end extends partially out from said handgrip member; and
    (e) spring means installed within said sleeve and surrounding a portion of said connecting shaft where one end of the spring means abuts against said distal end for absorbing the impact of the reciprocation movement of said rear engagement member.

17. The shock absorbing tool of claim 16 further comprising a pair of opposite protruding tabs extending outwardly from said connecting shaft and respectively engaged with a pair of slotted openings of said sleeve for preventing transverse movement of said sleeve.

18. The shock absorbing tool of claim 16, wherein said spring means is a coil spring.

19. The shock absorbing tool of claim 16, wherein said means for preventing transverse and longitudinal movements of said connecting shaft includes a pair of opposite protruding tabs extending outwardly from said connecting shaft and respectively engaged with a pair of slotted openings of said insert member.

20. The shock absorbing tool of claim 16, wherein said handgrip member further includes a curved portion to provide a pushing angle for a user's hand.

\* \* \* \* \*